US012628031B2

(12) United States Patent  (10) Patent No.: US 12,628,031 B2
Hafeez  (45) Date of Patent: May 12, 2026

(54) METHODS AND APPARATUS FOR SUPPORTING OPERATOR DEVICE SHARING OF TIME AND FREQUENCY RESOURCES IN A BAND

(71) Applicant: Charter Communications Operating, LLC, St. Louis, MO (US)

(72) Inventor: Rauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 478 days.

(21) Appl. No.: 18/113,008

(22) Filed: Feb. 22, 2023

(65) Prior Publication Data

US 2024/0259859 A1    Aug. 1, 2024

Related U.S. Application Data

(60) Provisional application No. 63/441,734, filed on Jan. 27, 2023.

(51) Int. Cl.
| | |
|---|---|
| *H04W 28/02* | (2009.01) |
| *H04L 5/00* | (2006.01) |
| *H04W 16/14* | (2009.01) |
| *H04W 16/18* | (2009.01) |
| *H04W 72/541* | (2023.01) |

(52) U.S. Cl.
CPC ....... *H04W 28/0268* (2013.01); *H04L 5/0005* (2013.01); *H04W 16/14* (2013.01); *H04W 16/18* (2013.01); *H04W 72/541* (2023.01)

(58) Field of Classification Search
CPC . H04W 28/0268; H04W 16/14; H04W 16/18; H04W 72/541; H04L 5/0005
See application file for complete search history.

(56) References Cited

U.S. PATENT DOCUMENTS

| | | | | |
|---|---|---|---|---|
| 10,951,314 | B2 * | 3/2021 | Cheng | H04W 72/542 |
| 2011/0205941 | A1 * | 8/2011 | Stanforth | H04W 72/0466 |
| | | | | 370/280 |
| 2014/0243009 | A1 * | 8/2014 | Nekovee | H04W 16/14 |
| | | | | 455/454 |
| 2017/0188241 | A1 * | 6/2017 | Mueck | H04W 16/14 |
| 2018/0242165 | A1 * | 8/2018 | Macmullan | H04W 16/18 |

(Continued)

*Primary Examiner* — Afshawn M Towfighi
(74) *Attorney, Agent, or Firm* — Straub & Straub; Michael P. Straub; Stephen T. Straub

(57) ABSTRACT

Methods and apparatus for implementing a spectrum scheduling controller (SSC) are described. The spectrum scheduling controller receives resources requests from operator devices, e.g., access points which can be in the form of base stations. The access points can, and sometimes do, correspond to different operators and/or use different communications technologies. The SSC determines the coverage areas of the operator devices requesting resources and groups them into groups based on the potential for interference, e.g., contour area overlap. Operator devices are synchronized on a frame and/or transmission slot level basis with a frame including multiple slots. A schedule is created allocating slots corresponding to operator devices based on latency and/or data transmission requirements. Device priority can be, and sometimes is, considered when generating a schedule. The schedule allocating resources is communicated to members of an operator device group to which the schedule relates.

17 Claims, 12 Drawing Sheets

(56) References Cited

U.S. PATENT DOCUMENTS

| | | | | |
|---|---|---|---|---|
| 2021/0006983 A1* | 1/2021 | Sun | .................... | H04W 16/14 |
| 2021/0175992 A1* | 6/2021 | Yavuz | .................... | H04W 24/10 |
| 2022/0132321 A1* | 4/2022 | Sun | .................... | H04W 16/14 |

* cited by examiner

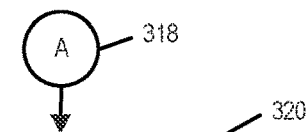

A ⟋ 318

⟋ 320

GENERATE, FOR EACH GROUP, A SCHEDULE ALLOCATING COMMUNICATIONS RESOURCES TO OPERATOR DEVICES IN SAID GROUP, EACH SCHEDULE ALLOCATING COMMUNICATIONS RESOURCES (E.G., UPLINK SLOTS AND DOWNLINK SLOTS OR UPLINK TIME-FREQUENCY RESOURCE BLOCKS AND DOWNLINK TIME-FREQUENCY RESOURCE BLOCKS) TO OPERATOR DEVICES IN SAID GROUP

⟋ 322

GENERATE A FIRST SCHEDULE ALLOCATING COMMUNICATIONS RESOURCES TO OPERATOR DEVICES IN SAID FIRST GROUP, SAID FIRST SCHEDULE ALLOCATING COMMUNICATIONS RESOURCES (E.G., UPLINK SLOTS AND DOWNLINK SLOTS OR UPLINK TIME-FREQUENCY RESOURCE BLOCKS AND DOWNLINK TIME-FREQUENCY RESOURCE BLOCKS) TO SAID FIRST AND SECOND OPERATOR DEVICES

⟋ 326

INCLUDE SPECIAL SLOTS IN SAID FIRST SCHEDULE, EACH SPECIAL SLOT IN SAID FIRST SCHEDULE INCLUDING A GUARD PERIOD

⟋ 327

INCLUDE OPERATOR SWITCHING GUARD PERIODS (WITH FIRST DURATION) BETWEEN DIFFERENT OPERATOR ALLOCATIONS

⟋ 324

GENERATE A SECOND SCHEDULE ALLOCATING COMMUNICATIONS RESOURCES TO OPERATOR DEVICES IN SAID SECOND GROUP, SAID SECOND SCHEDULE ALLOCATING COMMUNICATIONS RESOURCES (E.G., UPLINK SLOTS AND DOWNLINK SLOTS OR UPLINK TIME-FREQUENCY RESOURCE BLOCKS AND DOWNLINK TIME-FREQUENCY RESOURCE BLOCKS) TO SAID THIRD AND FOURTH OPERATOR DEVICES

⟋ 328

INCLUDE SPECIAL SLOTS IN SAID SECOND SCHEDULE, EACH SPECIAL SLOT IN SAID SECOND SCHEDULE INCLUDING A GUARD PERIOD

⟋ 329

INCLUDE OPERATOR SWITCHING GUARD PERIODS (WITH SECOND DURATION) BETWEEN DIFFERENT OPERATOR ALLOCATIONS

⟋ 330

COMMUNICATE, E.G. SEND, THE GENERATED SCHEDULES TO THE OPERATOR DEVICES

⟋ 332

COMMUNICATE, E.G. SEND, THE GENERATED FIRST SCHEDULE TO OPERATOR DEVICE IN THE FIRST GROUP INCLUDING THE FIRST OPERATOR DEVICE AND THE SECOND OPERATOR DEVICE

⟋ 334

COMMUNICATE, E.G. SEND, THE GENERATED SECOND SCHEDULE TO OPERATOR DEVICE IN THE SECOND GROUP INCLUDING THE THIRD OPERATOR DEVICE AND THE FOURTH OPERATOR DEVICE

⟋ 336

N — IS IT TIME TO RE-ASSIGN RESOURCES ? — Y

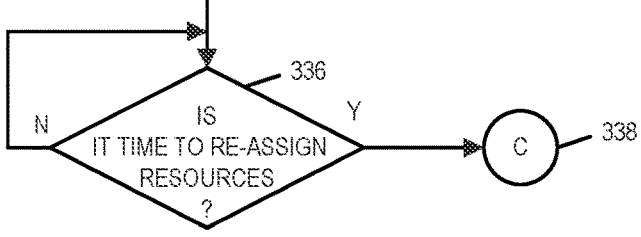

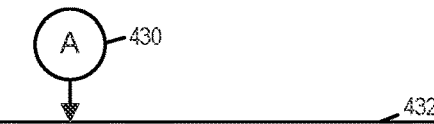

A  430

432

DETERMINE GUARD INTERVAL DURATION FOR SWITCHING BETWEEN SETS OF SLOTS ALLOCATED TO DIFFERENT DEVICES BASED ON DISTANCE BETWEEN DEVICES IN GROUP OF OPERATOR DEVICES BEING ASSIGNED RESOURCES, E.G. MAXIMUM DISTANCE BETWEEN OPERATOR DEVICES IN GROUP

434

DETERMINE A FIRST GUARD INTERVAL HAVING A FIRST DURATION WHEN DISTANCE BETWEEN DEVICES IN GROUP IS BELOW A FIRST THRESHOLD

436

DETERMINE A SECOND GUARD INTERVAL HAVING A SECOND DURATION WHEN DISTANCE BETWEEN DEVICES IN GROUP IS EQUAL TO OR ABOVE THE FIRST THRESHOLD, SAID SECOND GUARD INTERVAL BEING LONGER THAN SAID FIRST GUARD INTERVAL

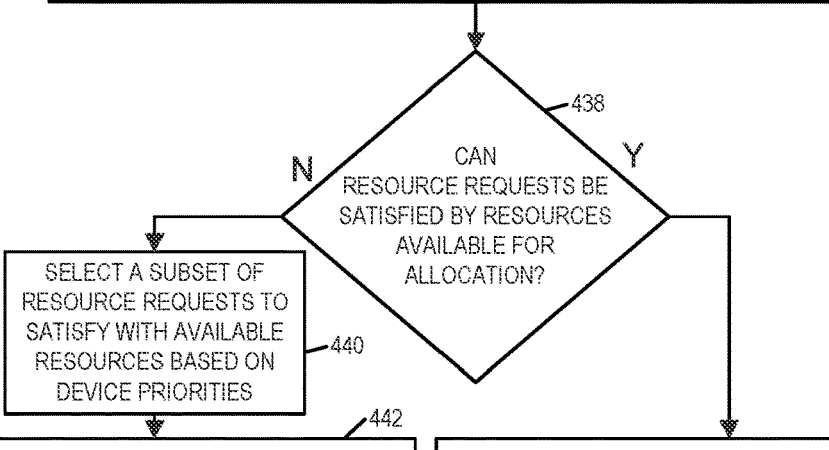

438

N          CAN RESOURCE REQUESTS BE SATISFIED BY RESOURCES AVAILABLE FOR ALLOCATION?          Y

SELECT A SUBSET OF RESOURCE REQUESTS TO SATISFY WITH AVAILABLE RESOURCES BASED ON DEVICE PRIORITIES

440

442

GENERATE SCHEDULE SATISFYING LATENCY REQUIREMENTS FOR RESOURCE REQUESTS SELECTED TO BE SATISFIED AND, IN SOME EMBODIMENTS, INCLUDING GUARD INTERVALS AT LOCATIONS CORRESPONDING TO TRANSITIONS BETWEEN SLOT ASSIGNMENTS TO DIFFERENT OPERATOR DEVICES 444                                446

ASSIGN SLOTS IN GROUPS OF ONE OR MORE CONSECUTIVE SLOTS WITH ALLOCATIONS TO DIFFERENT DEVICES OCCURRING BASED ON LATENCY REQUIREMENTS, E.G., DISTANCES BETWEEN SLOT ASSIGNMENTS NOT EXCEEDING MAXIMUM PERMITTED LATENCY CORRESPONDING TO AN OPERATOR DEVICE

ASSIGN SETS OF CONSECUTIVE SLOTS TO INDIVIDUAL OPERATOR DEVICES BASED ON DATA TRANSMISSION REQUIREMENTS AND/OR TO MINIMIZE THE NUMBER OF GUARD INTERVALS REQUIRED DUE TO SWITCHING BETWEEN SLOT ASSIGNMENTS TO DIFFERENT DEVICES

448

GENERATE SCHEDULE SATISFYING LATENCY REQUIREMENTS FOR DEVICES AND DATA/RESOURCE REQUESTS AND, IN SOME EMBODIMENTS, INCLUDING GUARD INTERVALS AT LOCATIONS CORRESPONDING TO TRANSITIONS BETWEEN SLOT ASSIGNMENTS TO DIFFERENT OPERATOR DEVICES 450                                452

ASSIGN SLOTS IN GROUPS OF ONE OR MORE CONSECUTIVE SLOTS WITH ALLOCATIONS TO DIFFERENT DEVICES OCCURRING BASED ON LATENCY REQUIREMENTS, E.G., DISTANCES BETWEEN SLOT ASSIGNMENTS NOT EXCEEDING MAXIMUM PERMITTED LATENCY CORRESPONDING TO AN OPERATOR DEVICE

ASSIGN SETS OF CONSECUTIVE SLOTS TO INDIVIDUAL OPERATOR DEVICES BASED ON DATA TRANSMISSION REQUIREMENTS AND/OR TO MINIMIZE THE NUMBER OF GUARD INTERVALS REQUIRED DUE TO SWITCHING BETWEEN SLOT ASSIGNMENTS TO DIFFERENT DEVICES

| FIGURE 4A |
| FIGURE 4B |
| FIGURE 4C |

METHODS AND APPARATUS FOR SUPPORTING OPERATOR DEVICE SHARING OF TIME AND FREQUENCY RESOURCES IN A BAND

RELATED APPLICATIONS

The present application claims the benefit of U.S. Provisional Patent application Ser. No. 63/441,734 which was filed on Jan. 27, 2023 and which is hereby expressly incorporated by reference in its entirety.

FIELD

The present application relates to communications systems and more particularly to methods and apparatus for efficient spectrum allocation including time-frequency sharing in a communications band.

BACKGROUND

Citizens Broadband Radio Services (CBRS) band spectrum is shared among three tiers of users by a spectrum access system (SAS) which enables spectrum sharing in the frequency domain. One problem with this approach is that in dense urban areas with many users vying for spectrum, SAS can only go down to a minimum of 10 MHz channel bandwidth for New Radio (NR) technology (5 MHz LTE). In case of higher user density, the is no choice for SAS but to reduce radio transmit powers, i.e., reduce coverage. Another problem with this approach is that users using adjacent frequencies have to use the same Time Division Duplexing (TDD) Uplink-Downlink configuration (along with being frame synchronized) in order to avoid base station to base station adjacent channel interference in the band.

6 GHZ is shared between unlicensed users and incumbent fixed satellite service (FSS) receivers. An automatic frequency controller (AFC) controls access to various frequencies in the band based on propagation modeling. Sharing among unlicensed users in 5 and 6 GHz bands is done by means of channel sensing, aka listen before talk (LBT). This approach, involving the use of LBT, is suitable for a high frequency band. However, for a low or mid frequency band, a LBT approach may not be effective. This approach, involving the use of LBT, is suitable for a high bandwidth band. In a low bandwidth band, such as CBRS or another mid frequency band, LBT results in inefficient channel use due to user contention, especially in a congested environment.

Based on the above discussion, there is a need for new methods and apparatus for implementing efficient time—frequency sharing in a band. It would be advantageous if at least some of the new methods and apparatus did not require implementing LBT operations.

SUMMARY

Methods and apparatus for implementing a spectrum scheduling controller (SSC) are described. In various exemplary embodiments the spectrum scheduling controller receives resources requests from operator devices, e.g., access points which can be in the form of base stations. The access points can be, and in some embodiments are, in a variety of different forms, e.g., macro base stations, femto cells, CBSD devices, small access points, etc. In addition, the access points can correspond to different operators and/or use different communications technologies. Thus, the SSC in some embodiments is a multi-operator control device which controls devices of multiple different operator systems.

The SSC receives registration information from individual access points providing information about the type operator device which is registering, the operator device's location, its priority level, resources, e.g., set of frequencies to which a request relates and which can be used by the operator device, transmission technology used or implemented by the operator device, requested transmit power and/or other device characteristics or properties. After or as part of registering, access points seeking communications resources request resource assignments from the SSC. Resource requests from operator devices, e.g., spectrum requests indicating requested uplink resources and/or requested downlink resources are received and processed by the SSC. The resource requests can, and sometimes do, also include information about latency requirements for uplink and downlink communications corresponding to an operator device requesting resources and/or the amount of uplink or downlink data to be communicated using the requested resources. In this way in assigning uplink/downlink resources the SSC can take into consideration latency and/or data transmission requirements in generating resource allocations. By taking into consideration latency requirements when generating resource allocations, e.g., in the form of a schedule which allocates the right to use a frequency band or other set of frequency resources for one or more periods of time to operator devices, the SSC can develop a schedule which is likely to avoid the dropping of data due to latency issues at least with regard to high priority operator devices.

As part of the process of granting resource requests the SSC determines coverage contours for the operator devices seeking to use spectrum, e.g., a set of frequencies such as a 20 MHz frequency block which is to be shared, e.g., used, by the requesting devices to which resources are assigned at the same or different times. By taking into consideration the determined coverage contours, e.g., transmission coverage areas of the requesting operator devices, operator devices which are likely to interfere with one another can be grouped for resource assignment purposes. In this way, scheduling of resources by the SSC can be used to limit, reduce or avoid interference between devices.

Resources are assigned to devices in a group of operator devices, in some embodiments, by communicating a schedule generated for the group by the SSC to the devices in the group. The schedule can and in some embodiments does include slots which are designated as uplink slots, downlink slots and/or special slots. Special slots can and sometimes are used where a transition in the schedule occurs between uplink and downlink use of the resources. A special slot can and in some embodiments does include a guard interval, e.g., in the form of a gap, in which devices are not to use the resources to reduce the risk of unintentional overlap between use of the resource for uplink and downlink transmission. The uplink/downlink switching guard interval in a special slot may occupy a small portion, e.g., fraction of a slot, and helps reduce the risk of interference between devices operating in an uplink mode and devices operating in a downlink mode. During downlink operation an operator device, e.g., access point in the form of a base station, transmits data and/or other signals to user devices. In uplink mode operator devices receive data transmitted by user or other end devices being provided network access by the operator devices serving as the user/end devices network point of attachment.

Thus, in downlink mode operation an operator device transmits data, e.g., user and/or application data to a user device also sometimes referred to as a UE or end point. In downlink mode operation user devices transmit user and/or application data to the operator device.

In various embodiments operator devices being scheduled are synchronized at least at a frame level where a frame includes multiple transmission slots. The transmission slots are designated by the schedule created by the SSC as uplink, downlink or special slots. The frame level synchronization ensures that slots of different operators will be aligned and that different operators devices which use slots in a schedule in a manner which is consistent with a communicated schedule even if they correspond to different operators or use different communications technologies.

In various embodiments in addition to guard intervals used at transmissions between uplink and downlink slots, in some embodiments guard intervals are incorporated into a schedule generated by the SSC so that they are positioned at locations where transitions in the operator device to which resource are allocated occur. For example, in some embodiments a device switching guard interval is inserted in a slot which corresponds to a switch from a resource allocation, e.g., downlink allocation to a first device, to a downlink allocation to a second device. Such device switching guard intervals normally occur at downlink slot boundaries where the slots are on each side of the boundary are allocated to a different operator device in a group.

In some embodiments the duration of a device switching guard interval is determined by the SSC based on the distance between the two devices between which the switch in resource allocations is being made. For example, in the case of a switch in a downlink slot assignment between a first operator device and a second device the SSC may assign a first guard interval having a first duration which is based on the distance, D1, between the first operator device and the second operator device. In the case of a switch between downlink assignments between the second operator device and a third operator device the SSC may and sometimes does allocate and include a second device switching guard interval in a generated schedule. The second device switching guard interval in some embodiments has a second duration which is a function of a second distance, D2, which is the distance between the second and third operator devices. In at least some embodiments the SSC includes a larger device switching guard interval the greater the distance between devices between which a slot assignment is being made. For example, when distance D2 is greater than distance D1, the second device switching guard interval will have a longer duration, e.g., occupies a larger portion of a slot, than the first device switching guard interval which was determined based on distance D1 which is less than distance D2.

After grouping of operator devices into groups, a resource utilization schedule is generated for and communicated to each group. The schedules of different groups will vary depending on the latency and data transmission requirements of the operator devices in an individual group.

In some embodiments schedules allocate resources to operator devices, e.g. the right to use a set of frequencies, for uplink or downlink transmission, for extended periods of time, e.g., hours, days or weeks, before anew schedule is generated and communicated to the devices requesting resources.

While generated schedules often last for a relatively long period of time, e.g., for hours, days, or weeks, the operator device grouping and scheduling process can be initiated in a variety of ways beyond simply the predicted expiration of a schedule which may trigger a periodic grouping and scheduling process. For example, in some embodiments grouping and scheduling can be and sometimes is be triggered by a resource request from an operator device, change in the indicated needs of an operator device with regard to latency and/or data transmission requirements for uplink and/or downing, a change in device priority and/or other changes such as a new operator device or relocation of an exiting operator device.

In various embodiments, the latency and data transmission requirements of an operator device are taken into consideration when generating a schedule in a group. A maximum permitted latency, e.g., in terms of downlink and/or uplink slots, is determined for individual operator devices. Slot allocations are then made when generating a schedule to ensure that the time between downlink or uplink slots assigned to a device do not result in a gap which exceeds the maximum permitted delay in downlink or uplink communications. Data transmission requirements are also taken into consideration when allocating slots to operator devices. Devices which need to support a particular data rate are assigned groups of consecutive slots, e.g., downlink slots, to support the required data rate in a given time period when possible. The allocation of multiple consecutive slots, e.g., downlink slots, to a single device reduces the number of device switching guard intervals as compared to schedules including alternating slot to device assignments thereby supporting high data rates by encouraging more efficient resource utilization since guard intervals correspond to resources which are to go unused.

In some embodiments due to the latency and data rate support considerations, in response to a reduction in acceptable latency as indicated by a shorter maximum latency time period, the SSC may, and sometimes does, switch to a schedule with greater switching of slot assignments between devices. For example, in the case where maximum downlink latency for a first device is low, alternating downlink transmission slots may be used in a schedule allocating resources to two operator devices. In cases where the devices are allowed greater latency, the devices are allocated a number of consecutive downlink slots before the downlink slot assignments switch thereby minimizing the number of device switching guard intervals included in the transmission schedule. Thus, it should be appreciated that switching may occur from a schedule with alternating device downlink slot assignment to a schedule with fewer slot to device assignment changes when latency requirements are relaxed, e.g., greater latency is allowed for one or more devices in a group. Switching from a schedule with multiple consecutive slots to device downlink assignments may and will occur when latency requirements are increased, e.g., requiring that one or more devices be provided downlink transmission opportunities on a more frequent basis then when less severe latency requirements are in place allowing for greater delays between downlink transmission opportunities.

In some embodiments a schedule allows for operator devices to be assigned the same slots for uplink communication while separate slots are assigned to the operator devices for downlink communication.

Scheduling of resource allocations to a group of operator devices can be, and sometimes is, based on relative device priority. In such a case, high priority devices may have their resource and latency requirements satisfied by being allocated resources, e.g., slots corresponding to a set of time and frequency resources, with one or more lower priority devices being allocated a number of slots which may not fully satisfy their resource requests.

While the SSC is primarily responsible for scheduling of transmission resources, e.g., transmission slots corresponding to time and frequency resources which can be used to transmit signals, in some embodiments the SSC also determines transmission power and can limit or restrict the transmission power used by one or more operator devices being scheduled. The authorized transmit power can be, and sometimes is, communicated to a device as part of the communication of the resource assignment which is sometimes communicated as a schedule of assigned transmission slots.

An exemplary method of operating spectrum scheduling controller (SSC), in accordance with some embodiments, comprises: receiving from each of a plurality of operator devices seeking to use spectrum a request for uplink resources, a request for downlink resources or a request for both uplink and downlink resources, said plurality of operator devices including a first operator device and a second operator device; grouping operator devices seeking to use spectrum into one or more groups based on coverage contour overlap of operator devices, expected interference, or a combination of contour overlap and expected interference, said grouping operator devices including grouping at least a first set of operator devices into a first group for resource assignment purposes, said groups including said first group including the first operator device and the second operator device; generating a first schedule allocating communications resources to operator devices in said first group, said first schedule allocating communications resources to said first and second operator devices; and communicating the first schedule to the first and second operator devices.

While various features discussed in the summary are used in some embodiments, it should be appreciated that not all features are required or necessary for all embodiments and the mention of features on the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 3C is a third part of a flowchart of an exemplary method of operating a spectrum scheduling controller (SSC) in accordance with an exemplary embodiment.

FIG. 3 comprises the combination of FIG. 3A, FIG. 3B and FIG. 3C.

FIG. 4B is a second part of a flowchart of a subroutine implementing an exemplary method of generating a schedule for a group of operator devices in accordance with an exemplary embodiment.

DETAILED DESCRIPTION

Figure 1:
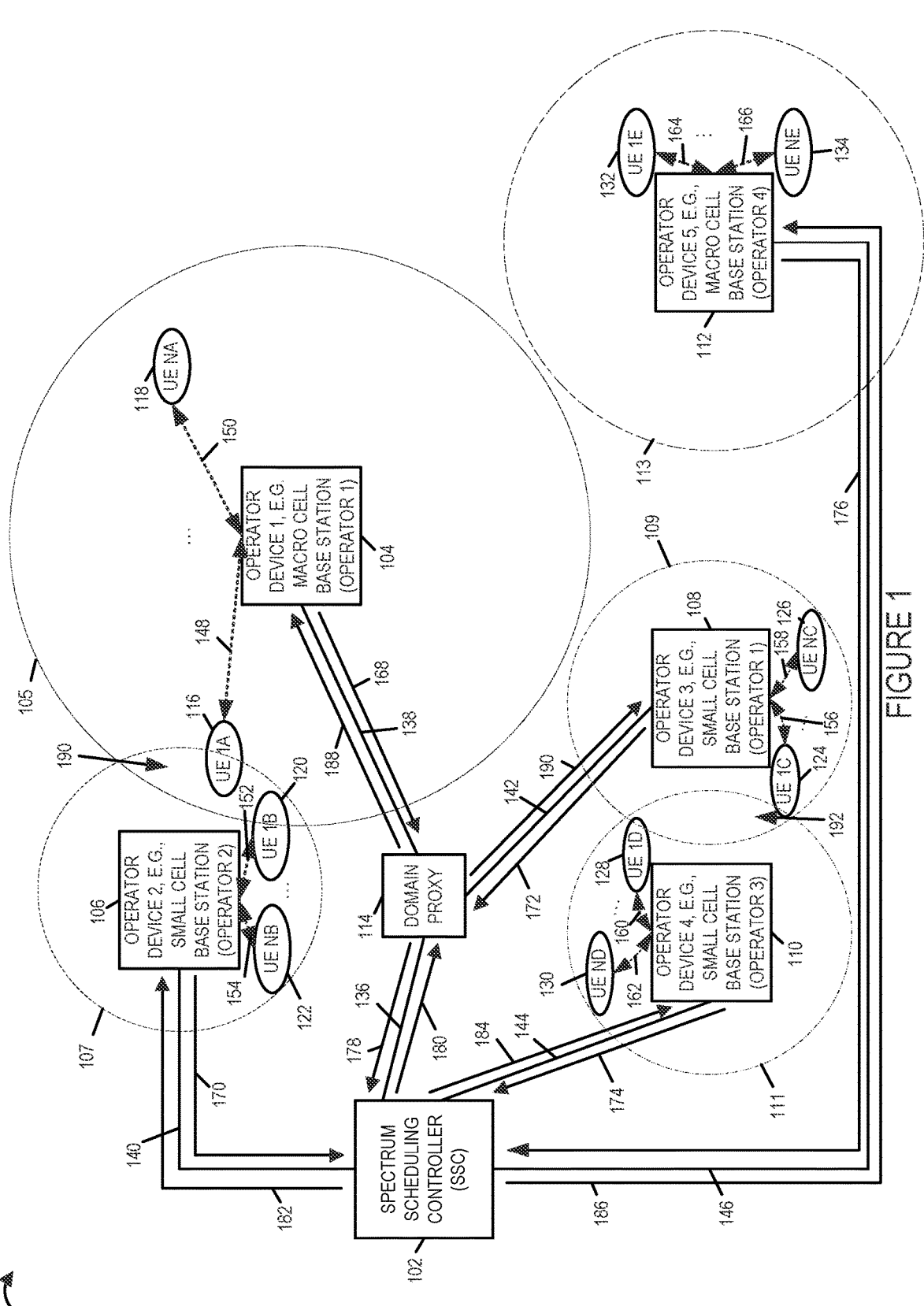
FIG. 1 is a drawing of an exemplary communications system including a spectrum scheduling controller (SSC) and a plurality of operator devices, e.g., macro cell base stations and small cell base stations which may correspond to different operator networks, in accordance with an exemplary embodiment.

FIG. 1 is a drawing of an exemplary communications system 100 in accordance with an exemplary embodiment. Exemplary communications system 100 includes a spectrum scheduling controller (SSC) 102, a plurality of operator devices (operator device 1 104, operator 2 106, operator device 3 108, operator device 4 110, operator device 5 112), and a domain proxy 114 coupled together as shown. The operator devices (operator device 1 104, operator 2 106, operator device 3 108, operator device 4 110, operator device 5 112) are timing synchronized, e.g., use a common timing reference source. Operator device 1 104, e.g., a macro cell base station of operator network 1, is coupled to domain proxy 114 via communications link 138. Operator device 2 106, e.g., a small cell base station of operator network 2, is coupled to SSC 102 via communications link 140. Operator device 3 108, e.g., a small cell base station of operator network 1, is coupled to domain proxy 114 via communications link 142. Operator device 4 110, e.g., a small cell base station of operator network 3, is coupled to SSC 102 via communications link 144. Operator device 5 112, e.g., a macro cell base station of operator network 4, is coupled to SSC 102 via communications link 146. Domain proxy 114 is coupled to SSC 102 via communications link 136. Wireless communications system 100 further includes a plurality of user equipment (UE) devices. A plurality of UE devices (UE 1A 116, . . . , UE NA 118) are coupled to operator device 1 104 via wireless communications links (148, . . . , 150), respectively. A plurality of UE devices (UE 1B 120, . . . , UE NB 122) are coupled to operator device 2 106 via wireless communications links (152, . . . , 154), respectively. A plurality of UE devices (UE 1C 124, . . . , UE NC 126) are coupled to operator device 3 108 via wireless communications links (156, . . . , 158), respectively. A plurality of UE devices (UE 1D 128, . . . , UE ND 130) are coupled to operator device 4 110 via wireless communications links (160, . . . , 162), respectively. A plurality of UE devices (UE 1E 132, . . . , UE NE 134) are coupled to operator device 5 112 via wireless communications links (164, . . . , 166), respectively.

The SSC 102 determines, e.g., using propagation models, a coverage contour area for each of the operator devices (104, 106, 108, 110, 112). Dotted line 105 represents the outer boundaries of the coverage contour area for operator device 1 104. Dashed line 107 represents the outer boundaries of the coverage contour area for operator device 2 106. Dashed-dotted line 109 represents the outer boundaries of the coverage contour area for operator device 3 108. Dashed-double dotted line 111 represents the outer boundaries of the coverage contour area for operator device 4 110. Short dash long dash line 113 represents the outer boundaries of the coverage contour area for operator device 5 112. The SSC 102 determines overlap of operator coverage contour areas. Area 190 is a determined overlap of coverage contour areas 105 and 107. Area 192 is a determined overlap of coverage contour areas 109 and 111. The SSC 102 groups the operator devices based on overlap of coverage contour areas. A groups of operator devices may, and sometimes does, include operator devices which belong to different operator networks, operator devices which correspond to different cell sizes, and/or operator devices which use different communications technologies and/or different communications protocols. In this example, the SSC 102 determines three groups: i) a group including operator device 1 104 and operator device 2 106; a group including operator device 3 108 and operator device 4 110; and a group including operator device 5 112. The SSC 102 generates a schedule including slots (e.g., downlink slots, uplink slots, and special slots) for each of the determined groups. A generated schedule includes, e.g., a sequence of numbered slots, a designation for the type (downlink, uplink, or special) of each slot in the sequence, information indicating which operator device or devices is being allocated each slot, and information indicating guard band duration, e.g., with regard to guard bands implemented within special slots. In some embodiments, special slots are transition slots in which a first portion of the slot is allocated to downlink signaling, a second portion of the slot is allocated to a guard band, and a third portion of the slot is allocated to uplink signaling. In some embodiments, the generated schedule further includes information indicating switching guard band durations, e.g., information indicating guard band durations between slots allocated to different operators. In various embodiments, a DL slot in a sequence is allocated to a single operator device in the group of operator devices; however, an UL slot may be allocated to one or more operator devices, e.g., depending on expected interference levels. In some embodiments, the operator switching guard band duration for a schedule is determined based on the distance between operator devices in a group.

Signals 168, e.g., registration signals and resource request signals, are sent from operator device 1 104 to SSC 102, via domain proxy 114, via communications links 138, 136. Signals 170, e.g., registration signals and resource request signals, are sent from operator device 2 106 to SSC 102 via communications link 140. Signals 172, e.g., registration signals and resource request signals. are sent from operator device 3 108 to SSC 102, via domain proxy 114, via communications links 142, 136. Signals 174, e.g., registration signals and resource request signals, are sent from operator device 4 110 to SSC 102 via communications link 144. Signals 176, e.g., registration signals and resource request signals, are sent from operator device 5 112 to SSC 102 via communications link 146. Signals 178 represents the combination of signals 168 and 172.

Signals 180, which includes registration response signals and schedules including resource allocations for operator device 1 104 and operator device 3 108 are sent, via communications link 136, from SSC 102 to domain proxy 114. Signals 188, sent, via communications link 138, from domain proxy 114 to operator device 1 104 include registration response signals and a schedule including resource allocations for operator device 1 104. Signals 190, sent, via communications link 142, from domain proxy 114 to operator device 3 108 include registration response signals and a schedule including resource allocation for operator device 3 108. SSC 102 sends, via communications link 140, signals 182 to operator device 2 106, said signals 182 including registration response signals and a schedule including resource allocations for operator device 2 106. SSC 102 sends, via communications link 144, signals 184 to operator device 4 110, said signals 184 including registration response signals and a schedule including resource allocations for operator device 4 110. SSC 102 sends, via communications link 146, signals 186 to operator device 5 112, said signals 186 including registration response signals and a schedule including resource allocations for operator device 5 112. In one embodiment, a first schedule is sent to operator device 1 104 and operator device 2 106, which represent a first group; a second schedule is sent to operator device 3 108 and operator device 4 110, which represent a second group; and a third schedule is sent to operator device 5 112, which represents a third group. The schedules are implemented by the operator devices, e.g., for a predetermined time interval. Updated schedules are subsequently generated by the SSC 102, e.g., based on different received resource requests from the operator devices, and sent to the operator devices to be implemented, e.g., for another predetermined time interval.

Figure 2:
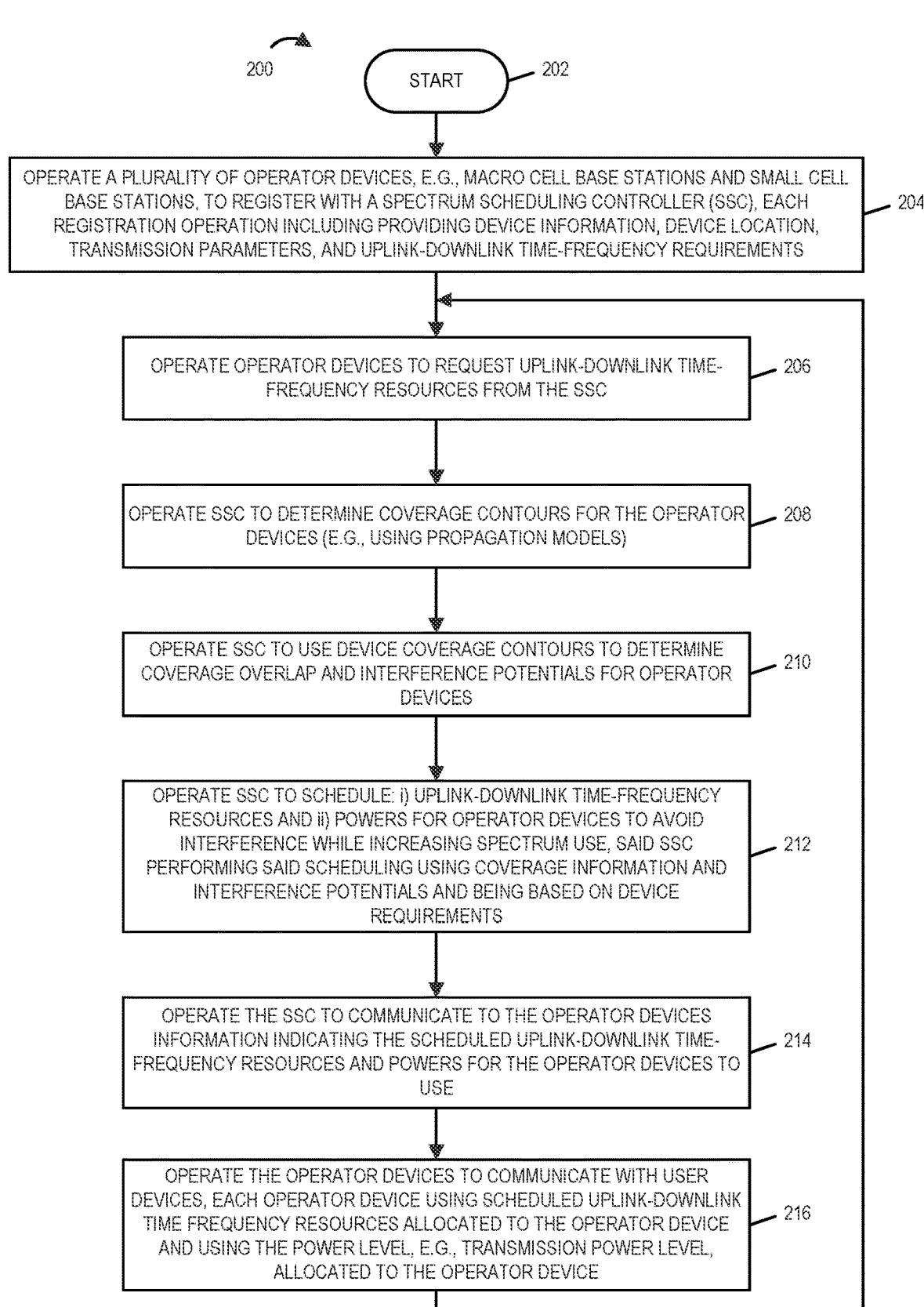
FIG. 2 is a flowchart of an exemplary method of operating a communications system including a spectrum scheduling controller (SSC) and a plurality of operator devices in accordance with an exemplary embodiment.

FIG. 2 is a flowchart 200 of an exemplary method of operating a communications system including a spectrum scheduling controller (SSC) and a plurality of operator devices in accordance with an exemplary embodiment. In one exemplary embodiment, the SSC is SSC 102 of system 100 of FIG. 1, and the plurality of operator devices includes operator device 1 104, operator device 2 106, operator device 3 108, operator device 4 110 and operator device 5 112 of system 100 of FIG. 1. Operation of the exemplary method starts in step 202 in which the communications system is powered on and initialized. Operation proceeds from start step 202 to step 204.

In step 204 a plurality of operator devices, e.g., macro cell base stations and small cell base stations, are operated to register with a spectrum scheduling controller (SSC), each registration of an operator device including operating the operator device to provide device information, device location information, transmission parameters and uplink-downlink time-frequency requirements to the SSC. Operation proceeds from step 204 to step 206.

In step 206 operator devices, e.g., a subset or the full set of operator devices which have registered with the SSC, are operated to request uplink-downlink time-frequency resources from the SSC. Operation proceeds from step 206 to step 208.

In step 208 the SSC is operated to determine coverage contours for the operator devices. In some embodiments, the SSC uses propagation models in determining the coverage contours for the operator devices. Operation proceeds from step 208 to step 210.

In step 210 the SSC is operated to use the determined coverage contours to determine coverage overlap and interference potentials for operator devices. Operation proceeds from step 210 to step 212.

In step 212 the SSC is operated to schedule: i) uplink-downlink time-frequency resources and ii) powers for operator devices to avoid interference while increasing spectrum use, said SSC performing said scheduling using coverage information and interference potentials and being based on device requirements. Operation proceeds from step 212 to step 214.

In step 214, the SSC is operated to communicate to the operator devices information indicating the scheduled uplink-downlink time-frequency resources and powers for the operator devices to use. Operation proceeds from step 214 to step 216.

In step 216 the operator devices are operated to communicate with user devices, each operator device using scheduled uplink-downlink time frequency resources allocated to the operator device and using the power level, e.g., operator device transmission power level, allocated to the operator device. In some embodiments step 216 is performed for a predetermined period of time, e.g., a day, then operation proceeds from step 216 to the input of step 206, in which the registered operator devices, currently seeking to use spectrum, send new and/or updated uplink-downlink time-frequency resource requests to the SSC.

Figure 3A:
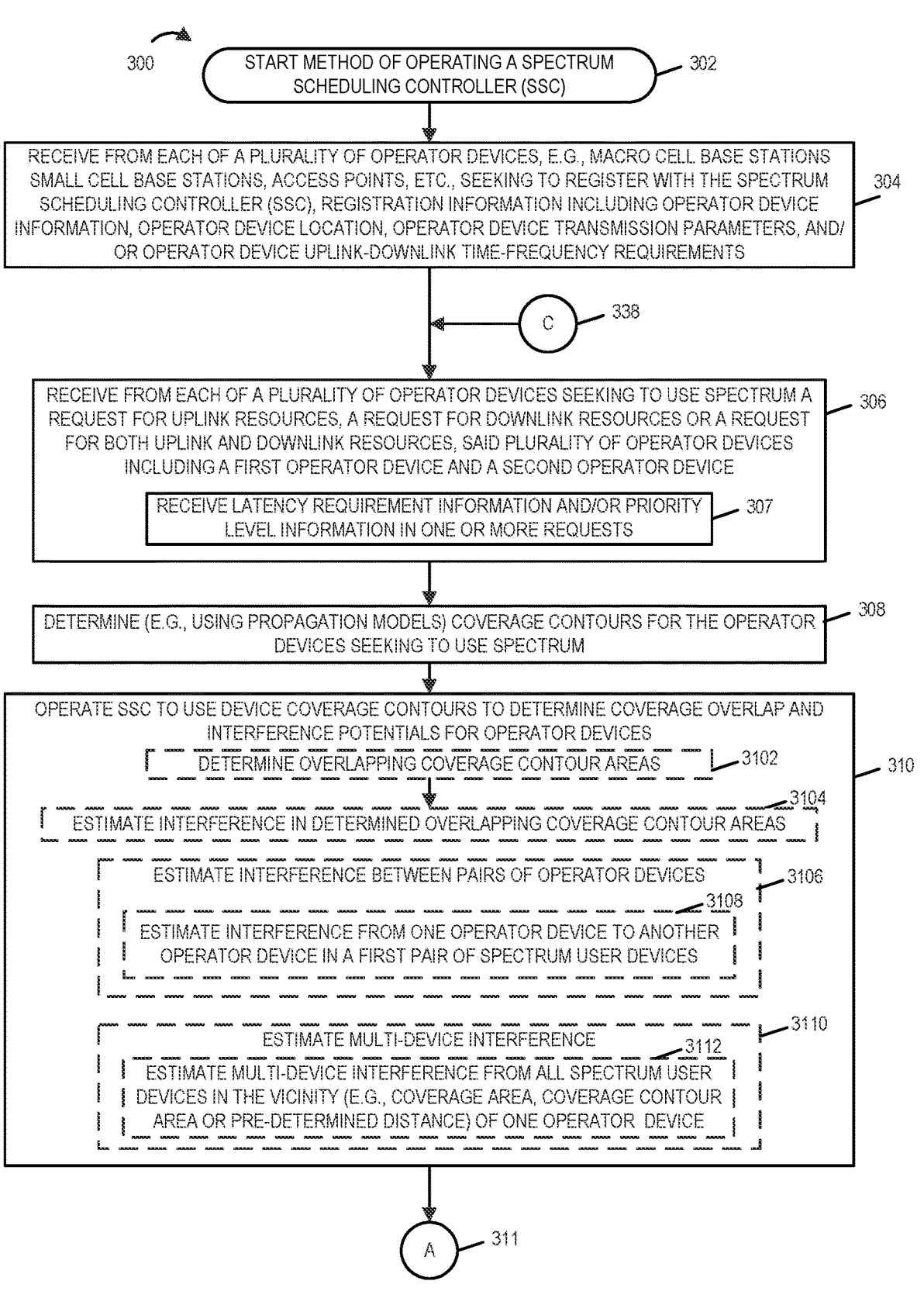
FIG. 3A is a first part of a flowchart of an exemplary method of operating a spectrum scheduling controller (SSC) in accordance with an exemplary embodiment.
Figure 3B:
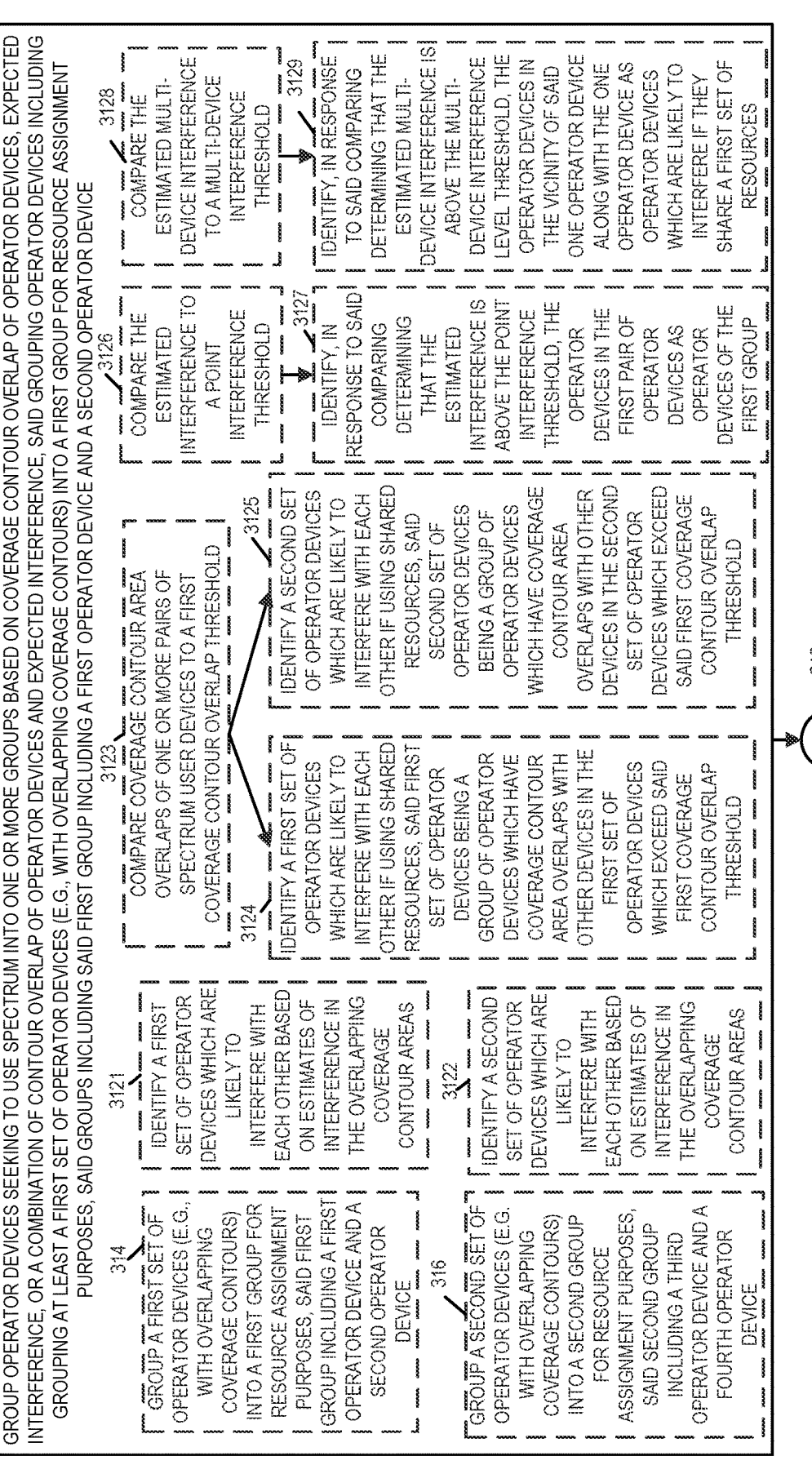
FIG. 3B is a second part of a flowchart of an exemplary method of operating a spectrum scheduling controller (SSC) in accordance with an exemplary embodiment.

FIG. 3, comprising the combination of FIG. 3A, FIG. 3B and FIG. 3C, is a flowchart 300 of an exemplary method of operating a spectrum scheduling controller (SSC) in accordance with various exemplary embodiments. The SSC implementing the method of flowchart 300 is, e.g., SSC 102 of system 100 of FIG. 1. Operation of the exemplary method starts in step 302 in which the SSC is powered on and initialized. Operation proceeds from start step 302 to step 304.

In step 304 the SSC receives from each of a plurality of operator devices, e.g., macro cell base stations and small cell base stations, access points, etc., seeking to register with the SSC, registration information including operator device information, operator device location, operator device transmission parameters and/or operator device uplink-downlink time-frequency requirements. In one exemplary embodiment, the plurality of operator devices includes operator device 1 (OD1) 104, operator device 2 (OD2) 106, operator device 3 (OD3) 108, operator device 4 (OD4) 110, and operator device 5 (OD5) 112 of system 100 of FIG. 1. Operation proceeds from step 304 to step 306.

In step 306 the SSC receives from each of a plurality of devices seeking to use spectrum a request for uplink resources, a request for downlink resources or a request for uplink and downlink resources, said plurality of operator devices including a first operator device and a second operator device. The plurality of devices seeking to use spectrum is a full set of registered operator devices or a subset of the registered operator devices. In one exemplary embodiment, the first operator device is OD1 104 and the second operator device is OD2 106. In another exemplary embodiment, the first operator device is OD3 108 and the second operator device is OD4 110. In some embodiments, step 306 includes step 307 in which the SSC receives latency requirement information and/or priority level information in one or more requests. Operation proceeds from step 306 to step 308.

In step 308 the SCC determines, e.g., using propagation models, coverage contours for the operator devices seeking to use spectrum. Operation proceeds from step 308 to step 310.

In step 310 the SSC uses the determined operator device coverage contours to determine coverage overlap and interference potentials for operator devices. Step 310 includes one or more or all of steps 3102, 3104, 3106, 3108, 3110 and 3112. In step 3102 the SSC determines overlapping coverage contour areas. Operation proceeds from step 3102 to step 3104. In step 3104 the SSC estimates interference in determined overlapping coverage contour areas. In step 3106 the SSC estimates interference between pairs of operator devices. Step 3106 includes step 3108 in which the SSC estimates interference from one operator device to another operator device in a first pair of spectrum user operator devices. In step 3110 the SSC estimates multi-device interference. Step 3110 includes step 3112 in which the SSC estimates multi-device interference from all spectrum user devices in the vicinity (e.g., coverage area, coverage contour area or a pre-determined distance) of one operator device (e.g., an operator device). Operation proceeds from step 310, via connecting node A 311, to step 312.

In step 312 the SSC groups operator devices seeking to use spectrum into one or more groups based on coverage contour overlap of operator devices, expected interference, or a combination of contour overlap of operator devices and expected interference, said grouping operator devices including grouping at least a first set of operator devices (e.g., with overlapping coverage contours) into a first group for resource assignment purposes, said groups including said first group including the first operator device and the second operator device. Step 312 includes one or more or all of steps 314, 316, 2121, 3122, 3123, 3124, 3125, 3126, 3126, 3128 and 3129. In different embodiments, different subsets of steps 314, 316, 2121, 3122, 3123, 3124, 3125, 3126, 3128 and 3129 are used.

In step 314 the SSC groups a first set of operator devices, e.g., with overlapping contours, into a first group for resource assignment purposes, said first group including a first operator device and a second operator device. In step 316 the SSC groups a second set of operator devices, e.g., with overlapping contours, into a second group for resource assignment purposes, said second group including a third operator device and a fourth operator device. In one exemplary embodiment, step 312 generates three groups: a group including OD1 104 and OD 2 106, a group including OD3 108 and OD4 110, and a group including OD5 112.

In step 3121 the SSC groups a first set of operator devices which are likely to interfere with each other based on estimates of interference in the overlapping coverage contour areas. In step 3122 the SSC groups a second set of operator devices which are likely to interfere with each other based on estimates of interference in the overlapping coverage contour areas.

In step 3123 the SSC compares coverage contour area overlaps of one or more pairs of spectrum user operator devices to a first coverage contour overlap threshold (e.g., a threshold corresponding to a 10 percent overlap of contours of spectrum user operator devices in a pair of spectrum user operator devices or a fixed size threshold, e.g. an overlap of a predetermined size). Operation proceeds from step 3123 to step 3124 and step 3125. In step 3124 the SSC identifies a first set of operator devices which are likely to interfere with each other if using shared resources, said first set of operator devices being operator devices which have coverage contour overlaps with other devices in the first set of operator devices which exceed said first coverage contour overlap threshold. In step 3125 the SSC identifies a second set of operator devices which are likely to interfere with each other if using shared resources, said second set of operator devices being operator devices which have coverage contour overlaps with other devices in the second set of operator devices which exceed said first coverage contour overlap threshold.

In step 3126 the SSC compares the estimated interference to a point interference threshold (e.g., a predetermined interference level threshold over which interference is unacceptable from a spectrum sharing perspective). Operation proceeds from step 3126 to step 3127. In step 3127 the SSC identifies, in response to said comparing determining that the estimated interference is above the point interference threshold, the operator devices in the first pair of operator devices as operator devices of the first group (e.g., where operator devices in the first group are likely to interfere if they use the same set of frequency resources at any given time).

In step 3128 the SSC compares the estimated multi-device interference to a multi-device interference threshold (e.g., a predetermined interference level threshold over which interference is unacceptable from a multi-operator device sharing perspective). Operation proceeds from step 3128 to step 3129. In step 3129 the SSC identifies, in response to said comparing determining that the estimated multi-device interference is above the multi-device interference level threshold, the operator devices in the vicinity of said one operator device along with the one operator device as operator devices which are likely to interfere if they share a first set of resources. For example, said one operator device and said operator devices in the vicinity of the one operator device which are likely to interfere are identified, based on multi-device interference estimation, as operator devices of the first group.

Operation proceeds from step 312, via connecting node B 318 to step 320.

In step 320 the SSC generates, for each group, a schedule allocating communications resources to operator devices in said group, each schedule allocating communications resources (e.g., uplink slots and downlink slots or uplink time-frequency resource blocks and downlink time-frequency resource blocks) to operator devices in said group. In some embodiments, a generated schedule may, and sometimes does, allocate special slots to operator devices. In some embodiments, step 320 calls a subroutine for generating a schedule for a group of operator device (e.g., subroutine 400 of FIG. 4), for each group, and receives a generated schedule for the group from the subroutine.

Step 320 includes step 322, and in some embodiments, step 324. In step 322 the SSC generates a first schedule allocating communications resources (e.g., uplink slots and downlink slots or uplink time-frequency resource blocks and downlink time-frequency resource blocks) to operator devices in said first group, said first schedule allocating uplink and downlink communications resources (e.g., uplink slots and downlink slots or uplink time-frequency resource blocks and downlink time-frequency resource blocks) to said first and second operator devices. In some embodiments, step 322 includes step 326 in which the SSC includes special slots in said first schedule, each special slot in said first schedule including a guard period. In some embodiments, step 322 includes step 327 in which the SSC includes operator switching guard periods with a first duration in said first schedule. In step 324 the SSC generates a second schedule allocating communications resources (e.g., uplink slots and downlink slots or uplink time-frequency resource blocks and downlink time-frequency resource blocks) to operator devices in said second group, said second schedule allocating uplink and downlink communications resources (e.g., uplink slots and downlink slots or uplink time-frequency resource blocks and downlink time-frequency resource blocks) to third and fourth operator devices. In some embodiments, step 324 includes step 328 in which the SSC includes special slots in said second schedule, each special slot in said second schedule including a guard period. In some embodiments, step 324 includes step 329 in which the SSC includes operator switching guard periods with a second duration in said second schedule. Operation proceeds from step 320 to step 330.

In step 330 the SSC communicates, e.g., sends, the generated schedules to the operator devices. Step 330 includes step 332, and in some embodiments, step 334. In step 332 the SSC communicates, e.g., sends, the generated first schedule to operator devices in the first group including the first operator device and the second operator device. In step 334 the SSC communicates, e.g., sends, the generated second schedule to operator devices in the second group including the third operator device and the fourth operator device. Operation proceeds from step 330 to step 336.

In step 336 the SSC determines if it is time to re-assign resources, e.g., the SSC determines in step 336 if a predetermined time interval for operating using the generated set of schedules has been reached. If the SSC determines that it is not time to re-assign resources, then the operator devices are allowed to continue operating using the last generated set of schedules, and operation proceeds from the output of step 336 to the input of step 336 for another test at a later point in time. However, if the SSC determines that it is time to re-assign resources, then operation proceeds from the output of step 336, via connecting node B 338 to step 306, in which the SSC receives from each of a plurality of operator devices, currently seeking to use spectrum, a request for resources.

Figure 4A:
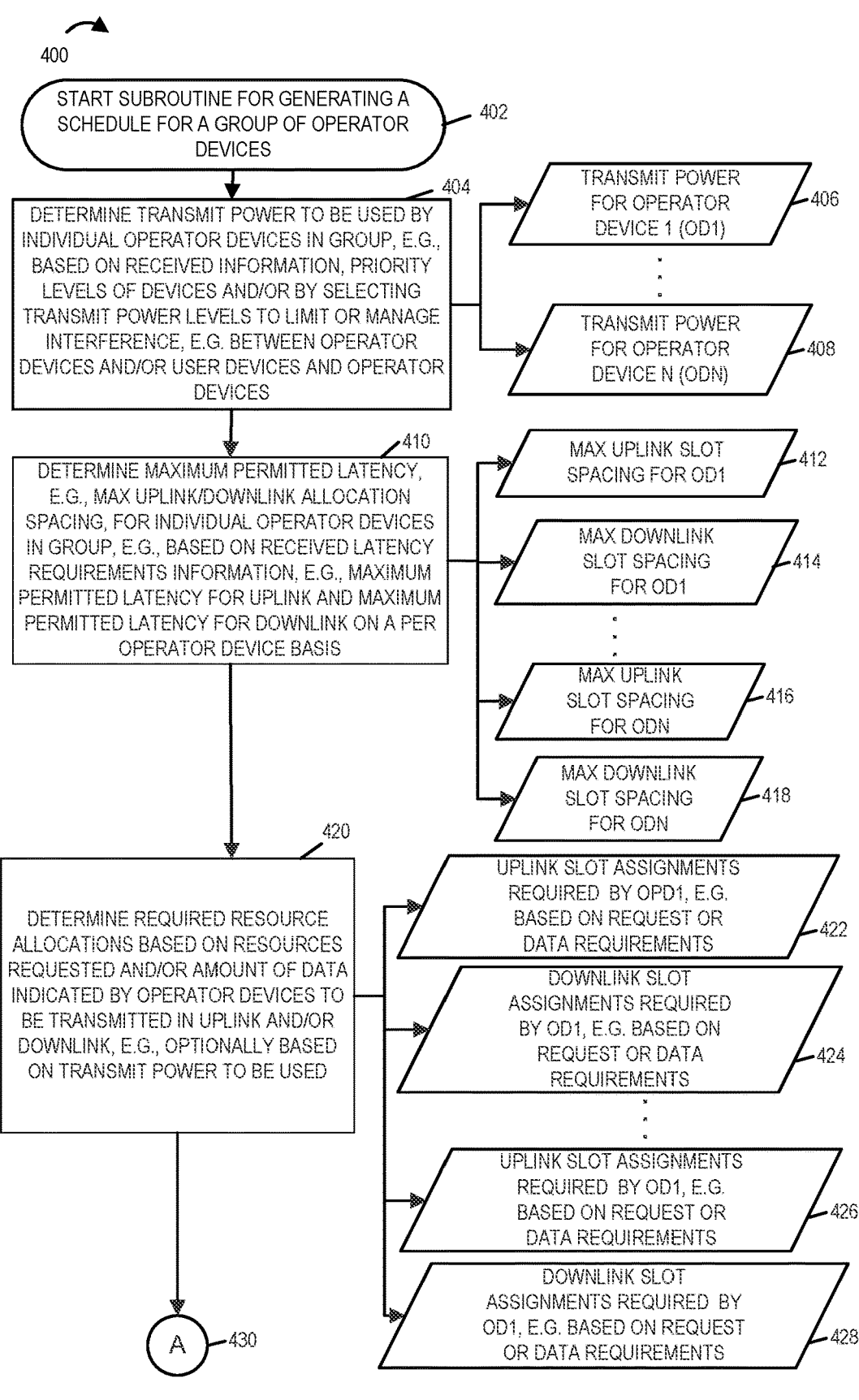
FIG. 4A is a first part of a flowchart of a subroutine implementing an exemplary method of generating a schedule for a group of operator devices in accordance with an exemplary embodiment.
Figures 4, 4C:
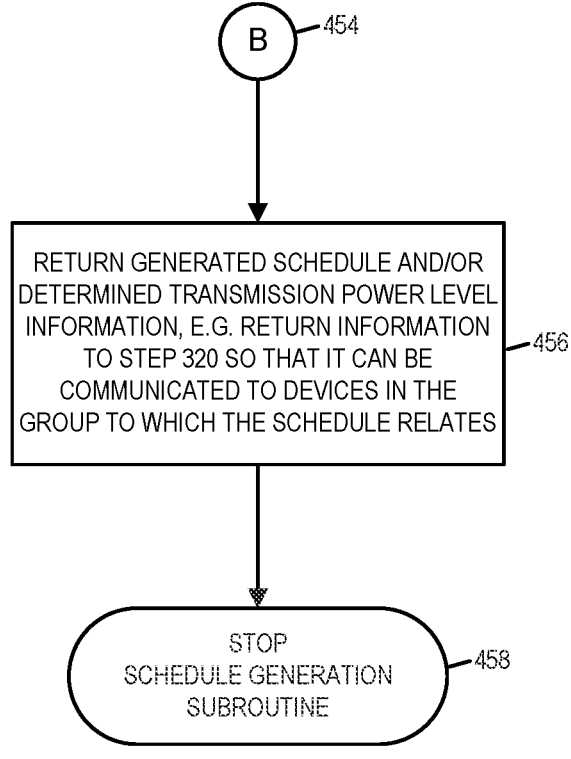
FIG. 4C is a third part of a flowchart of a subroutine implementing an exemplary method of generating a schedule for a group of operator devices in accordance with an exemplary embodiment.
FIG. 4 comprises the combination of FIG. 4A, FIG. 4B and FIG. 4C.

FIG. 4 is a flowchart 400 of a subroutine implementing an exemplary method of generating a schedule for a group of operator devices in accordance with an exemplary embodiment. Operation of the exemplary method starts in step 402, e.g., in response to a call from step 320 of FIG. 3B. Operation proceeds from start step 402 to step 404.

In step 404 the spectrum scheduling controller, e.g., SSC 102, determines transmit power to be used by individual operator devices in a group, based on received information, priority levels of devices and/or by selecting transmit power levels to limit or manage interference, e.g., between operator devices and/or user devices and operator devices. Outputs from step 404 include a set of transmit power levels for operator devices in the group (transmit power for operator device 1 (OD1) 406, . . . , transmit power for operator device N (ODN) 408). Operation proceeds from step 404 to step 410.

In step 410 the SSC determines maximum permitted latency, e.g., maximum uplink/downlink allocation spacing, for individual operator devices in the group, e.g., based on received latency requirements information, e.g., maximum permitted latency for uplink and maximum permitted latency from downlink on a per operator device basis. Outputs from step 410 include maximum uplink slot spacing and maximum downlink slot spacing for each operator device in the group (maximum uplink slot spacing for OD1 412, maximum downlink slot spacing for OD1 414, . . . , maximum uplink slot spacing for ODN 416, maximum downlink slot spacing for ODN 418. Operation proceeds from step 410 to step 420.

In step 420 the SSC determines required resource allocations based on resources requested and/or the amount of data indicated by operator devices to be transmitted in uplink and/or downlink, e.g., optionally based on transmit power to be used. Outputs from step 420 include uplink slot assignments required and downlink slot assignments required for each operator device in the group (uplink slot assignments required by OD1, e.g., based on request or data requirements 422, downlink slot assignments required by OD1, e.g., based on request or data requirements 424, . . . , uplink slot assignments required by ODN, e.g., based on request or data requirements 426, downlink slot assignments required by ODN, e.g., based on request or data requirements 428. Operation proceeds from step 420, via connecting node A 430 to step 432.

In step 432 the SSC determines guard interval duration for switching between sets of slots allocated to different devise based on the distance between devices in the group of operator devices being assigned resources, e.g., based on a maximum distance between operator devices in the group. Step 432 includes step 434 and step 436, one of which is performed during each iteration of step 432. In step 434 the SSC determines a first guard interval having a first duration when the distance between devices in the group is below a first threshold. In step 436 the SSC determines a second guard interval having a second duration when the distance between devices in the group is equal to or above the first threshold, said second guard interval being longer than said first guard interval. Operation proceeds from step 432 to step 438.

In step 438 the SSC determines whether or not the resource request for the group can be satisfied by resources available for allocation. If the determination is that the resource requests for the group cannot be satisfied by the resources available for allocation, then operation proceeds from step 438 to step 440. However, if the determination is that the resource requests for the group can be satisfied by the resources available for allocation, then operation proceeds from step 438 to step 448.

In step 440 the SSC selects a subset of the resource request to satisfy with the available resources based on device priorities. Operation proceeds from step 440 to step 442. In step 442 the SSC generates a schedule satisfying latency requirements for resource requests selected to be satisfied, and in some embodiments, including guard intervals at locations corresponding to transitions between slot assignments to different operator devices. Step 442 includes step 444 and step 446. In step 444 the SSC assigns slots in groups of one or more consecutive slots with allocations to different devices occurring based on latency requirements, e.g., distance between slot assignments not exceeding maximum permitted latency corresponding to an operator device. In step 446 the SSC assigns sets of consecutive slots to individual operator devices based on data transmission requirements and/or to minimize the number of guard intervals required due to switching between slot assignments to different operator devices.

In step 448 the SSC generates a schedule satisfying latency requirements for devices and data/resource requests and, in some embodiments, including guard intervals at locations corresponding to transitions between slot assignments to different operator devices. Step 448 includes step 450 and step 452. In step 450 the SSC assigns slots in groups of one or more consecutive slots with allocations to different devices occurring based on latency requirements, e.g., distance between slot assignments not exceeding maximum permitted latency corresponding to an operator device. In step 452 the SSC assigns sets of consecutive slots to individual operator devices based on data transmission requirements and/or to minimize the number of guard intervals required due to switching between slot assignments to different devices. Operation proceeds from step 442 or step 448, via connecting node B 454 to step 456. In step 456 the subroutine returns the generated schedule and/or determined transmission power level information, e.g., returns information to step 320 so that it ca be communicated to operator devise in the group to which the schedule relates. Operation proceeds from step 456 to stop schedule generation step 458.

Figure 5:
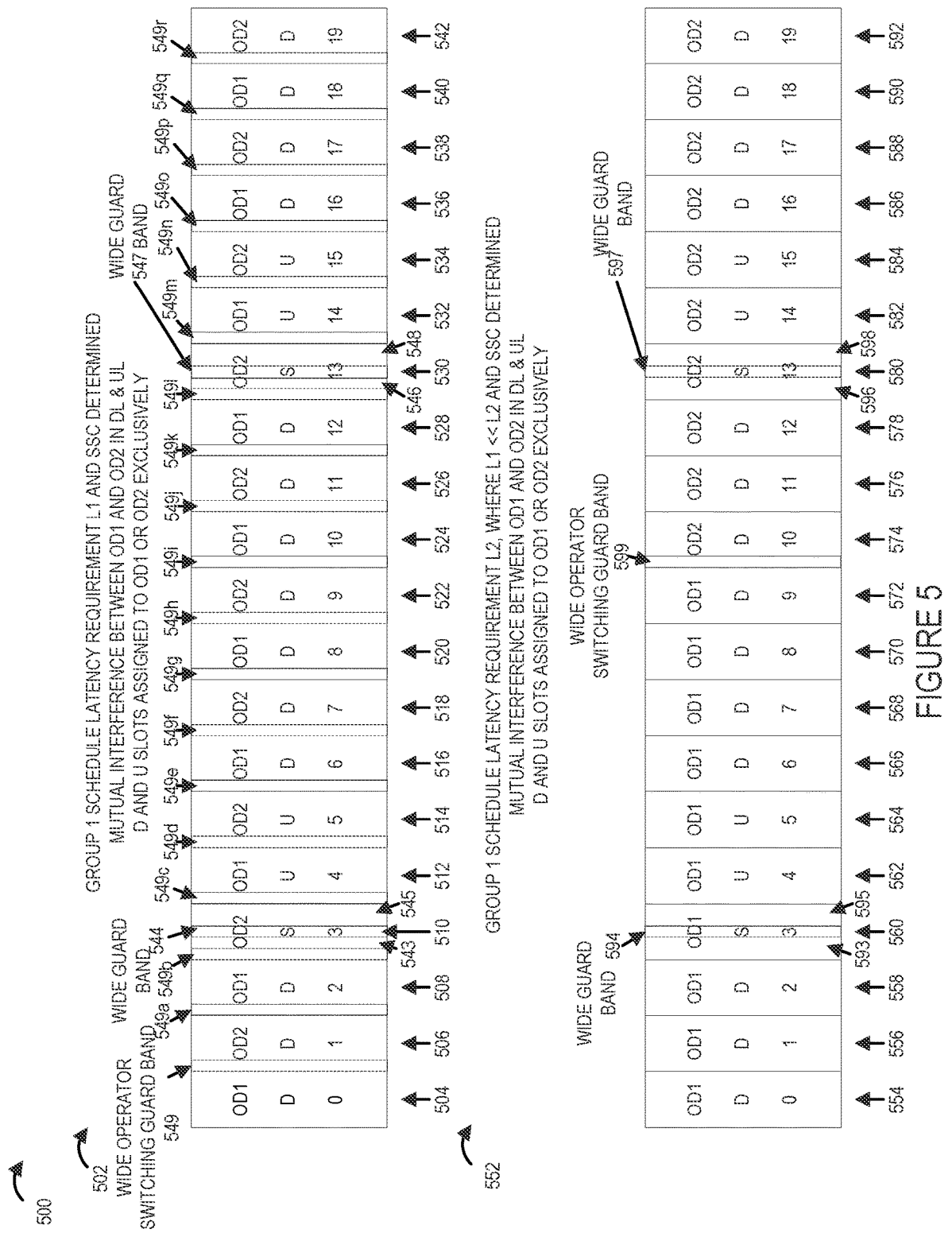
FIG. 5 is a drawing illustrating two exemplary schedules generated by a SSC for a first group of operator devices in accordance with an exemplary embodiment.

FIG. 5 is a drawing 500 illustrating two exemplary schedules (502, 552) generated by a SSC, e.g., SSC 102, for a first group of operator devices, e.g. OD1 104 and OD2 106, in accordance with an exemplary embodiment. In some embodiments, 30 kHz sub-carrier spacing is used with 20 slots/subframe, and 10 sub-frames/frame. Exemplary schedule 502 is an exemplary SSC generated schedule for a determined group 1 of operator devices (e.g., OD1 104 and OD2 106) satisfying a latency requirement L1. Based on SSC determined mutual interference between OD1 and OD2 downlink and uplink slots are being exclusively assigned to either OD1 or OD2. In this example, the slots are alternatively assigned to OD1 and OD2 to satisfy the latency requirement L1.

Exemplary schedule 502 represents one iteration of a 20 slot recurring subframe. Slot 0 504 is assigned to operator device OD1 to be used for downlink communications. Slot 1 506 is a downlink (D) slot assigned to operator device OD2 to be used for downlink communications. Slot 2 508 is a downlink (D) slot assigned to operator device OD1 to be used for downlink communications. Slot 3 510 is a special (S) slot assigned to operator device OD2. A first portion 543 of slot 3 510 is to be used by operator device OD2 for downlink communications. A second portion 544 of slot 3 510 is a guard band interval, which is to be left unused. A third portion 545 of slot 3 510 is to be used by operator device OD2 for uplink communications. Slot 4 512 is an uplink (U) slot assigned to operator device OD1 to be used for uplink communications. Slot 5 514 is an uplink (U) slot assigned to operator device OD2 to be used for uplink communications. Slot 6 516 is a downlink (D) slot assigned to operator device OD1 to be used for downlink communications. Slot 7 518 is a downlink (D) slot assigned to operator device OD2 to be used for downlink communications. Slot 8 520 is a downlink (D) slot assigned to operator device OD1 to be used for downlink communications. Slot 9 522 is a downlink (D) slot assigned to operator device OD2 to be used for downlink communications. Slot 10 524 is a downlink (D) slot assigned to operator device OD1 to be used for downlink communications. Slot 11 526 is a downlink (D) slot assigned to operator device OD2 to be used for downlink communications. Slot 12 528 is a downlink (D) slot assigned to operator device OD1 to be used for downlink communications. Slot 13 530 is a special (S) slot assigned to operator device OD2. A first portion 546 of slot 13 530 is to be used by operator device OD2 for downlink communications. A second portion 547 of slot 13 530 is a guard band interval, which is to be left unused. A third portion 548 of slot 13 530 is to be used by operator device OD2 for uplink communications. Slot 14 532 is an uplink (U) slot assigned to operator device OD1 to be used for uplink communications. Slot 15 534 is an uplink (U) slot assigned to operator device OD2 to be used for uplink communications. Slot 16 536 is a downlink (D) slot assigned to operator device OD1 to be used for downlink communications. Slot 17 538 is a downlink (D) slot assigned to operator device OD2 to be used for downlink communications. Slot 18 540 is a downlink (D) slot assigned to operator device OD1 to be used for downlink communications. Slot 19 542 is a downlink (D) slot assigned to operator device OD2 to be used for downlink communications.

In some embodiments, switching guard band time periods (which are not to be used) are included to separate switching between different operator devices. In one such embodiment, wide operator switching guard bands (549, 549*a*, 549*b*, 549*c*, 549*d*, 549*e*, 549*f*, 549*g*, 549*h*, 549*i*, 549*j*, 549*k*, 549*l*, 549*m*, 549*n*, 549*o*, 549*p*, 549*q*, 549*r*) are included at the beginning of slots (506, 508, 510, 512, 514, 516, 518, 520, 522, 524, 526, 528, 530, 532, 534, 536, 538, 540, 542), respectively.

Exemplary schedule 552 is an exemplary SSC generated schedule for a determined group 1 of operator devices (e.g., OD1 104 and OD2 106) satisfying a latency requirement L2, where L1<<L2. Based on SSC determined mutual interference between OD1 and OD2 downlink and uplink slots are being exclusively assigned to either OD1 or OD2. In this example, the first 10 consecutive slots are assigned to operator device OD1, and the second 10 consecutive slots are assigned to operator device OD2, and this assignment satisfies the latency requirement L2.

Exemplary schedule 552 represents one iteration of a 20 slot recurring subframe. Slot 0 554 is a downlink (D) slot assigned to operator device OD1 to be used for downlink communications. Slot 1 556 is a downlink (D) slot assigned to operator device OD1 to be used for downlink communications. Slot 2 558 is a downlink (D) slot assigned to operator device OD1 to be used for downlink communications. Slot 3 560 is a special (S) slot assigned to operator device OD1. A first portion 593 of slot 3 560 is to be used by operator device OD1 for downlink communications. A second portion 594 of slot 3 560 is a guard band interval, which is to be left unused. A third portion 595 of slot 3 560 is to be used by operator device OD1 for uplink communications. Slot 4 562 is an uplink (U) slot assigned to operator device OD1 to be used for uplink communications. Slot 5 564 is an uplink (U) slot assigned to operator device OD1 to be used for uplink communications. Slot 6 566 is a downlink (D) slot assigned to operator device OD1 to be used for downlink communications. Slot 7 568 is a downlink (D) slot assigned to operator device OD1 to be used for downlink communications. Slot 8 570 is a downlink (D) slot assigned to operator device OD1 to be used for downlink communications. Slot 9 572 is a downlink (D) slot assigned to operator device OD1 to be used for downlink communications. Slot 10 574 is a downlink (D) slot assigned to operator device OD2 to be used for downlink communications. Slot 11 576 is a downlink (D) slot assigned to operator device OD2 to be used for downlink communications. Slot 12 578 is a downlink (D) slot assigned to operator device OD2 to be used for downlink communications. Slot 13 580 is a special (S) slot assigned to operator device OD2. A first portion 596 of slot 13 580 is to be used by operator device OD2 for downlink communications. A second portion 597 of slot 13 580 is a guard band interval, which is to be left unused. A third portion 598 of slot 13 580 is to be used by operator device OD2 for uplink communications. Slot 14 582 is an uplink (U) slot assigned to operator device OD2 to be used for uplink communications. Slot 15 584 is an uplink (U) slot assigned to operator device OD2 to be used for uplink communications. Slot 16 586 is a downlink (D) slot is assigned to operator device OD2 to be used for downlink communications. Slot 17 588 is a downlink (D) slot assigned to operator device OD2 to be used for downlink communications. Slot 18 590 is a downlink (D) slot assigned to operator device OD2 to be used for downlink communications. Slot 19 592 is a downlink (D) slot assigned to operator device OD2 to be used for downlink communications.

In some embodiments, switching guard band time periods (which are not to be used) are included to separate switching between different operator devices. In one such embodiment, wide operator switching guard band 599 is included at the beginning of slot 10 574. It should be appreciated that schedule 552 allocates less time to operator switching guard intervals, than schedule 502; however, schedule 502 accommodates lower latency requirements than schedule 552.

Figure 6:
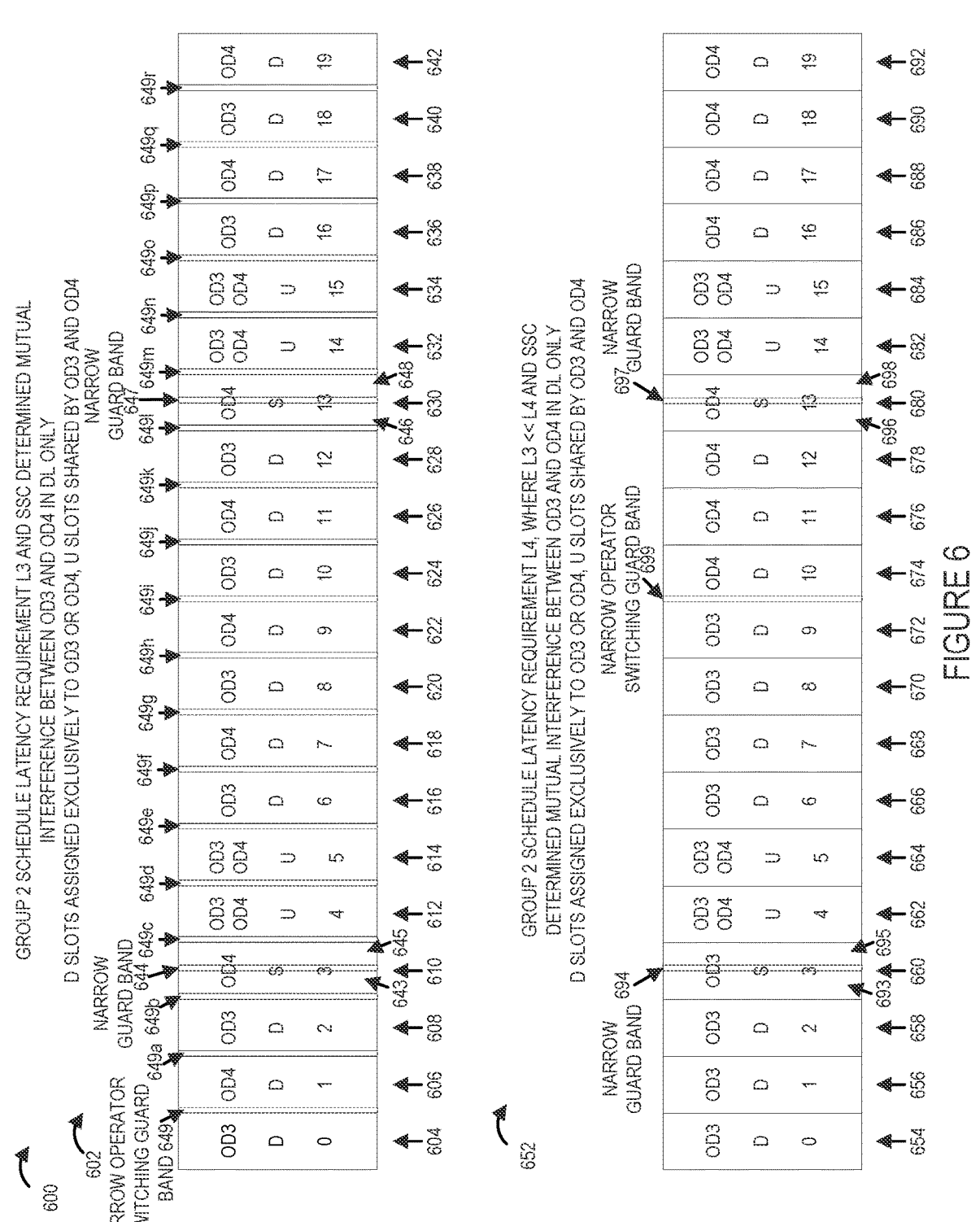
FIG. 6 is drawing illustrating two exemplary schedules generated by a SSC for a second group of operator devices in accordance with an exemplary embodiment.

FIG. 6 is drawing 600 illustrating two exemplary schedules (602, 652) generated by a SSC for a second group of operator devices in accordance with an exemplary embodiment. In some embodiments, 30 kHz sub-carrier spacing is used with 20 slots/subframe, and 10 sub-frames/frame.

Exemplary schedule 602 is an exemplary SSC generated schedule for a determined group 2 of operator devices (e.g., OD3 108 and OD4 110) satisfying a latency requirement L3. Based on SSC determined mutual interference between OD3 and OD4 downlink slots are being exclusively assigned to either OD1 or OD2; however, uplink slots are shared by OD3 and OD4. In this example, the slots are alternatively assigned to OD3 and OD4 to satisfy the latency requirement L3.

Exemplary schedule 602 represents one iteration of a 20 slot recurring subframe. Slot 0 604 is a downlink (D) slot assigned to operator device OD3 to be used for downlink communications. Slot 1 606 is a downlink (D) slot assigned to operator device OD4 to be used for downlink communications. Slot 2 608 is a downlink (D) slot assigned to operator device OD3 to be used for downlink communications. Slot 3 610 is a special (S) slot assigned to operator device OD4. A first portion 643 of slot 3 610 is to be used by operator device OD4 for downlink communications. A second portion 644 of slot 3 610 is a guard band interval, which is to be left unused. A third portion 645 of slot 3 610 is to be used by operator OD4 for uplink communications. In some embodiments, the third portion 645 is also assigned to operator device OD3 to use for uplink communications. Slot 4 612 is an uplink (U) slot assigned to both operator device OD3 and operator device OD4 to be used for uplink communications. Slot 5 614 is an uplink (U) slot assigned to both operator device OD3 and operator device OD4 to be used for uplink communications. Slot 6 616 is a downlink (D) slot assigned to operator device OD3 to be used for downlink communications. Slot 7 618 is a downlink (D) slot assigned to operator device OD4 to be used for downlink communications. Slot 8 620 is a downlink (D) slot assigned to operator device OD3 to be used for downlink communications. Slot 9 622 is a downlink (D) slot assigned to operator device OD4 to be used for downlink communications. Slot 10 624 is a downlink (D) slot assigned to operator device OD3 to be used for downlink communications. Slot 11 626 is a downlink (D) slot assigned to operator device OD3 to be used for downlink communications. Slot 12 628 is a downlink (D) slot assigned to operator device OD3 to be used for downlink communications. Slot 13 630 is a special (S) slot assigned to operator device OD4. A first portion 646 of slot 13 630 is to be used by operator device OD4 for downlink communications. A second portion 647 of slot 13 630 is a guard band interval, which is to be left unused. A third portion 648 of slot 13 630 is to be used by operator device OD4 for uplink communications. In some embodiments, the third portion 648 of slot 13 630 is also to be used by operator device OD3 for uplink communications. Slot 14

632 is an uplink (U) slot assigned to both operator device OD3 and operator device OD4 to be used for uplink communications. Slot 15 634 is an uplink (U) slot assigned to both operator device OD3 and operator device OD4 to be used for uplink communications. Slot 16 636 is a downlink (D) slot assigned to operator device OD3 to be used for downlink communications. Slot 17 638 is a downlink (D) slot assigned to operator device OD4 to be used for downlink communications. Slot 18 640 is a downlink (D) slot assigned to operator device OD3 to be used for downlink communications. Slot 19 642 is a downlink (D) slot assigned to operator device OD4 to be used for downlink communications.

In some embodiments, operator switching guard band time periods (which are not to be used) are included to separate switching between different operator devices. In one such embodiment, narrow operator switching guard bands (649, 649a, 649b, 649c, 649d, 649e, 649f, 649g, 649h, 649i, 649j, 649k, 649l, 649m, 649n, 649o, 649p, 649q, 649r) are included at the beginning of slots (606, 608, 610, 612, 614, 616, 618, 620, 622, 624, 626, 628, 630, 632, 634, 636, 638, 640, 642), respectively.

Exemplary schedule 652 is an exemplary SSC generated schedule for a determined group 2 of operator devices (e.g., OD3 108 and OD4 110) satisfying a latency requirement L4, where L3<<L4. Based on SSC determined mutual interference between OD3 and OD4 downlink slots are being exclusively assigned to either OD3 or OD4; however, uplink slots are shared by OD3 and OD4. In this example, the first 10 consecutive slots are assigned to operator device OD3, and the second 10 consecutive slots are assigned to operator device OD4, and this assignment satisfies the latency requirement L4.

Exemplary schedule 652 represents one iteration of a 20 slot recurring subframe. Slot 0 654 is a downlink (D) slot assigned to operator device OD3 to be used for downlink communications. Slot 1 656 is a downlink (D) slot assigned to operator device OD3 to be used for downlink communications. Slot 2 658 is a downlink (D) slot assigned to operator device OD3 to be used for downlink communications. Slot 3 660 is a special (S) slot assigned to operator device OD3. A first portion 693 of slot 3 660 is to be used by operator device OD3 for downlink communications. A second portion 694 of slot 3 660 is a guard band interval, which is to be left unused. A third portion 695 of slot 3 660 is to be used by operator device OD3 for uplink communications. In some embodiments, the third portion 695 of slot 3 660 is also to be used by operator device OD4 for uplink communications. Slot 4 662 is an uplink (U) slot assigned to both operator device OD3 and operator device OD4 to be used for uplink communications. Slot 5 664 is an uplink (U) slot assigned to both operator device OD3 and operator device OD4 to be used for uplink communications. Slot 6 666 is a downlink (D) slot assigned to operator device OD3 to be used for downlink communications. Slot 7 668 is a downlink (D) slot assigned to operator device OD3 to be used for downlink communications. Slot 8 670 is a downlink (D) slot assigned to operator device OD3 to be used for downlink communications. Slot 9 672 is a downlink (D) slot assigned to operator device OD3 to be used for downlink communications. Slot 10 674 is a downlink (D) slot assigned to operator device OD4 to be used for downlink communications. Slot 11 676 is a downlink (D) slot assigned to operator device OD4 to be used for downlink communications. Slot 12 678 is a downlink (D) slot assigned to operator device OD4 to be used for downlink communications. Slot 13 680 is a special (S) slot assigned to operator device OD4.

A first portion 696 of slot 13 680 is to be used by operator device OD4 for downlink communications. A second portion 697 of slot 13 680 is a guard band interval, which is to be left unused. A third portion 698 of slot 13 680 is to be used by operator device OD4 for uplink communications. In some embodiments, the third portion 698 of slot 13 680 is also to be used by operator device OD3 for uplink communications. Slot 14 682 is an uplink (U) slot assigned to both operator device OD3 and operator device OD4 to be used for uplink communications. Slot 15 684 is an uplink (U) slot assigned to both operator device OD3 and operator device OD4 to be used for uplink communications. Slot 16 686 is a downlink (D) slot assigned to operator device OD4 to be used for downlink communications. Slot 17 688 is a downlink (D) slot assigned to operator device OD4 to be used for downlink communications. Slot 18 690 is a downlink (D) slot assigned to operator device OD4 to be used for downlink communications. Slot 19 692 is a downlink (D) slot assigned to operator device OD4 to be used for downlink communications.

In some embodiments, operator switching guard band time periods (which are not to be used) are included to separate switching between different operator devices. In one such embodiment, narrow operator switching guard band 699 is included at the beginning of slot 10 674. It should be appreciated that schedule 652 allocates less time to operator switching guard intervals, than schedule 602; however, schedule 602 accommodates lower latency requirements than schedule 652.

Figure 7:
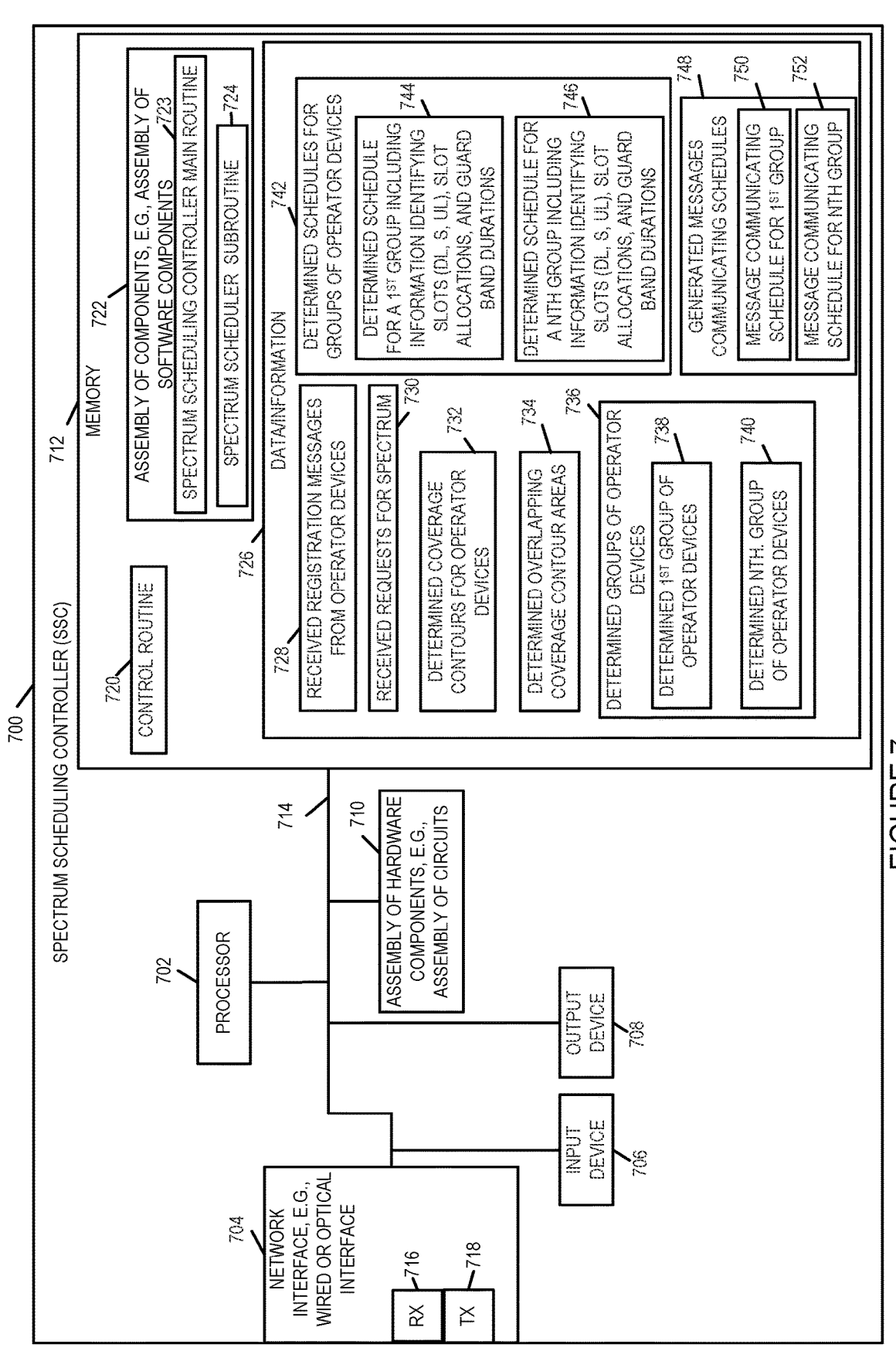
FIG. 7 is a drawing of an exemplary spectrum scheduling controller (SSC) in accordance with an exemplary embodiment.

FIG. 7 is a drawing of an exemplary spectrum scheduling controller (SSC) 700 in accordance with an exemplary embodiment. SSC 700 is, e.g., SSC 102 of system 100 of FIG. 1 and/or a SSC implementing a method in accordance with steps of flowchart 200 of FIG. 2, steps of flowchart 300 of FIG. 3 and steps of flowchart 400 of FIG. 4. Exemplary SSC 700 includes a processor 702, e.g., a CPU, a network interface 704, an input device 706, e.g., a keyboard, an output device 708, e.g., a display, an assembly of hardware components 710, e.g., an assembly of circuits, memory 712 and a bus 714 over which the various elements may interchange data and information.

Network interface 704, e.g., a wired or optical interface, includes a receiver 716 and a transmitter 718. Exemplary signals received via receiver 716 includes registration request signals from operator devices and resource requests from operator devices, e.g., spectrum requests indicating requested uplink resources and/or requested downlink resources. Exemplary signals transmitted via transmitter 718 includes registration response signals and generated schedules communicating granted resources allocated to operator devices and information communicating power levels at which the operator devices are allowed to operate.

Memory 712 includes a control routine 720, an assembly of components 722, and data/information 726. Assembly of components 722, e.g., an assembly of software components, includes a spectrum scheduling controller main routine 723 and a spectrum scheduler subroutine 724. Control routine 720 includes instructions, which when executed by processor 702 control the SSC 700 to perform basic device operational functions such as, e.g., controlling the network interface 706, controlling input device 706, controlling output device 700, accessing memory 712, storing in memory 712, etc. Spectrum scheduling controller main routine 722 includes instructions, which when executed by processor 702 control the SSC 700 to implement steps of a method, e.g., steps of the method of flowchart 300 of FIG. 3. Spectrum scheduler subroutine 724 includes instructions, which when executed by processor 702 control the SSC 700 to implement steps of a method, e.g., steps of the method of flowchart 400 of FIG. 4.

Data/information 726 includes received registration messages from operator devices 728, received requests for spectrum 730, determined coverage contours for operator devices 732, determined overlapping coverage contour areas 734, determined groups of operator devices 736, determined schedules for groups of operator devices 742 and generated messages communicating schedules 748. Determined groups of operator devices 736 includes a plurality of different determined groups of operator devices (determined 1st group of operator devices 738, . . . , determined Nth group of operator devices 740. Determined schedules for groups of operator devices 742 includes a plurality of different determined schedules for groups of operator devices (a determined schedule for a 1st group of operator devices including information identifying slot (DL, S, UL) allocations to operator devices in the 1st group and (operator switching) guard band durations 744, . . . , a determined schedule for an Nth group of operator devices including information identifying slot (DL, S, UL) allocations to operator devices in the Nth group and (operator switching) guard band durations 746). Generated messages communicated schedules 748 include a message communicating the generated schedule for the 1st group of operator devices 750 and a message communicating the generated schedule for the Nth group of operator devices 752. In some embodiments, operator device power level information, e.g., maximum allowable transmit power level information for each operator device in the group, is communicated as part of a schedule corresponding to the group or in addition a schedule corresponding to the group.

Figure 8:
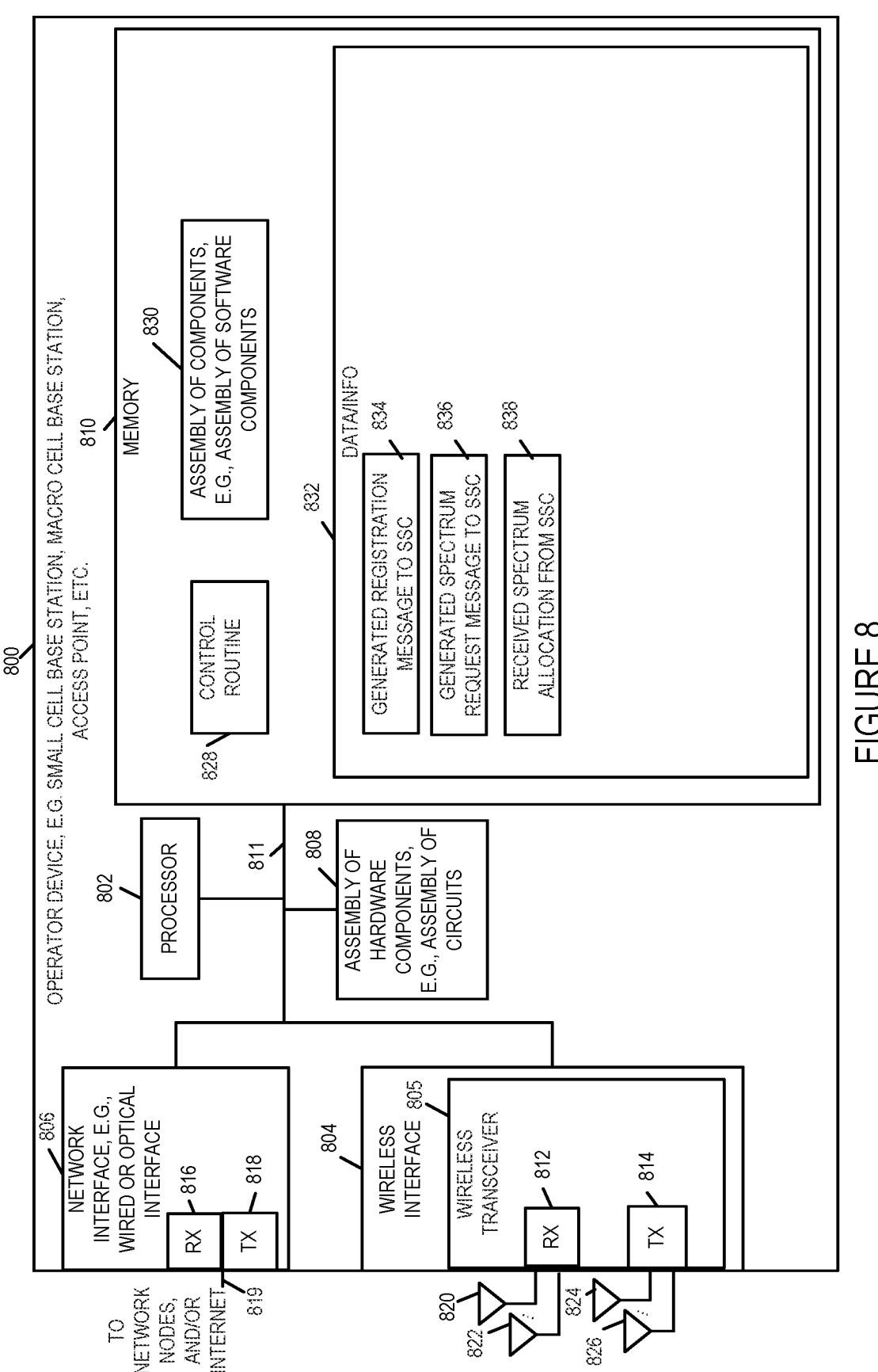
FIG. 8 is a drawing of an exemplary operator device, e.g., a macro cell base station, a small cell base station, or an access point, in accordance with an exemplary embodiment.

FIG. 8 is drawing of an exemplary operator device 800, e.g., a macro cell base station, a small cell base station, an access point, etc., in accordance with an exemplary embodiment. Operator device 800 is, e.g., any of the operator devices OD1 104, OD2 106, OD3 108, OD4 110, OD5 112 of system 100 of FIG. 1, an operator device implementing steps of flowchart 200 of FIG. 2 and/or an operator device described with respect to flowchart 300 of FIG. 3 and/or an operator device described with respect to flowchart 400 of FIG. 4.

Exemplary operator (OD) device 800 includes a processor 802, e.g., a CPU, a wireless interface 804, a network interface 806, an assembly of hardware components 808, e.g., an assembly of components, and a memory 810 coupled together via a bus 811 over which the various elements may interchange data and information. Wireless interface 804 includes a wireless receiver 812 coupled to one or more receive antennas (820, . . . 822) and a wireless transmitter 814 coupled to one or more transmit antennas (824, . . . , 826). In some embodiments the wireless receiver 812 and wireless transmitter 814 are included as part of a transceiver 805, e.g., a transceiver chip. Network interface 806, e.g., a wired or optical interface, includes a receiver 816 and a transmitter 816 coupled to an interface connector 819, which couples the operator device 800 to network nodes including a SSC, and/or the Internet. Registration signals and resource request signals are sent from operator device 800 to a SSC via transmitter 818 and interface connector 819. Registration response signals, schedules including resource allocations pertaining to operator device 800 and transmission power level information, which are sourced from the SSC, are received via interface connector 819 and receiver 816. Memory 810 includes a control routine 828, an assembly of components 830, e.g., an assembly of software components, and data/information 832. Data/information 832 includes a generated registration message to be sent to the SSC 834, a generated spectrum request message to be sent to the SSC 836 and a received spectrum allocation from the SSC 838, communicated via a a schedule to a group of operator devices in which operator device 800 is a member.

Various aspects and/or features of some embodiments of the present invention are further described below. Methods and apparatus directed to a system and method for efficient time-frequency sharing among operators in a band are described. A scheduler, e.g., a spectrum scheduling controller (SSC), implemented in accordance with features of an embodiment of the present invention, controls time, frequency and power for frame-synchronized operators in a band. The scheduler allows operators to reserve uplink-downlink time-frequency resources.

Various benefits of the present invention will now be described. Tight inter-operator network synchronization possible today, and used in accordance with the present invention, makes a time-based sharing approach in a band, in accordance with a feature of an embodiment of the present invention, more efficient than a frequency based sharing approach. Frequency based sharing relies on advanced and costly filtering techniques at both the transmitter and receiver sides to avoid adjacent interference. Time based sharing allows operators to request resources in either downlink (DL) or uplink (UL) direction depending upon their traffic needs. Time-based sharing is more efficient than channel sensing (LBT) in congested environments due to resource reservation (used with the time-based sharing approach) as opposed to contention (which occurs with the LBT approach). Time-based sharing can be implemented using existing 5G NR and emerging 6G technologies.

In one embodiment of the present invention, a spectrum scheduling controller (SSC) schedules uplink-downlink time-frequency resources for frame-synchronized operators sharing a band. With knowledge of operator device information and propagation modeling, the SSC avoids scheduling users on the same time-frequency resources where they may potentially interfere with each other, while scheduling users on the same time-frequency resources where they are expected not interfere with each other. Thus, the available resources are used very efficiently.

The SSC may, and in some embodiments does, schedule time-frequency resources for time division duplexing (TDD) transmission using symbols, resource blocks (RBs), time slots, subframes, and/or frequency carriers. The SSC, may, and in some embodiments does, schedule both uplink and downlink resources. In some embodiments, guard periods are used between operator allocations to avoid interference due to timing offset, delay or dispersion. In some embodiments, the SSC controls transmit power or Effective Isotropic Radiated Power (EIRP) for operator devices. The SSC attempts to increase spectrum use efficiency while reducing interference. In various embodiments, operators indicate their needs to the SSC, e.g., in the form of needed resources, allowed latency, etc., and the SSC attempts to satisfy operator needs while practicing fairness in the band.

In some embodiments of the present invention, the SSC also schedules spatial resources for frame-synchronized users in a band with knowledge of antenna beamforming information. Users are scheduled to avoid directional impact to each other.

In some embodiments of the present invention, the SSC charges users for scheduled resources. In some such embodiments, charging is based on the amount of granted resources, population density and/or traffic.

In some embodiments of the present invention, the SSC provides differentiated access to users based on priority or pay. In some such embodiments differentiated access is provided by scheduling more resources more often.

Numbered List of Exemplary Method Embodiments

Method Embodiment 1. A method of operating spectrum scheduling controller (SSC) (102), the method comprising: receiving (306) from each of a plurality of operator devices (104, 106, 108, 110, 112) seeking to use spectrum (e.g., resources of a frequency band that is used by multiple operator devices, e.g., of different types and/or corresponding to different operators) a request for uplink resources (e.g., time and/or frequency resources), a request for downlink resources or a request for both uplink and downlink resources, said plurality of operator devices including a first operator device (104 or 108) and a second operator device (106 or 110); grouping (312) operator devices seeking to use spectrum into one or more groups (e.g., a group including operator devices 104, 106; another group including operator devices 108, 110) based on coverage contour overlap of operator devices, expected interference, or a combination of contour overlap of operator devices and expected interference, said grouping operator devices including grouping at least a first set of operator devices into a first group for resource assignment purposes, said groups including said first group including the first operator device (104 or 108) and the second operator device (106 or 110); generating (322) a first schedule (502 or 550 or 602 or 650) allocating communications resources to operator devices in said first group, said first schedule allocating communication resources to said first and second operator devices; and communicating (e.g., sending) (332) the first schedule to the first and second operator devices.

Method Embodiment 2. The method of Method Embodiment 1, wherein said first schedule allocates uplink slots and downlink slots to said first and second operator devices.

Method Embodiment 3. The method of Method Embodiment 1, wherein said first schedule allocates uplink time-frequency resource blocks and downlink time-frequency resource blocks to said first and second operator devices.

Method Embodiment 4. The method of Method Embodiment 1, further comprising: determining (308) coverage contours for the operator devices seeking to use spectrum; determining (3102) overlapping coverage contour areas; and wherein grouping (312) operator devices seeking to use spectrum into one or more groups is based on overlap of determined coverage contours for the operator devices; and wherein operator devices in the first group have overlapping coverage contours.

Method Embodiment 5. The method of Method Embodiment 1, further comprising: estimating (3104) interference in determined overlapping coverage contour areas; and wherein grouping (312) operator devices seeking to use spectrum into one or more groups includes: identifying (3121) a first set of operator devices which are likely to interfere with each other based on the estimates of interference in the overlapping coverage contour areas.

Method Embodiment 6. (overlap of coverage contours grouping case with an overlap threshold being used) The method of Method Embodiment 4 wherein grouping (312) of operator devices includes: comparing (3123) coverage contour area overlaps of one or more pairs of spectrum user devices to a first coverage contour overlap threshold (e.g., a threshold corresponding to a 10 percent overlap of contours of spectrum user devices in a pair of spectrum user devices or a fixed size threshold, e.g., an overlap area of a predetermined size); and identifying (3124) a first set of operator devices which are likely to interfere with each other if using shared resources, said first set of operator devices being a group of operator devices which have coverage contour area overlaps with other devices in the first set of operator devices which exceed said first coverage contour overlap threshold.

Method Embodiment 7. (point protection) The method of Method Embodiment 1, further comprising: estimating (3108) interference from one operator device to another operator device in a first pair of spectrum user devices; and wherein grouping (312) of operator devices includes: comparing (3126) the estimated interference to a point interference threshold (e.g., a predetermined interference level threshold over which interference is unacceptable from a spectrum sharing perspective); and identifying (3127), in response to said comparing determining that the estimated interference is above the point interference threshold, the operator devices in the first pair of operator devices as operator devices of the first group (e.g., where operator devices in the first group are likely to interfere if they use the same set of frequency resources at any given time).

Method Embodiment 8. (aggregate protection) The method of Method Embodiment 1, further comprising: estimating (3112) multi-device interference from all spectrum user devices in the vicinity (e.g., coverage area, coverage area contour, or predetermined distance) of one operator device (e.g., an operator device); and wherein grouping (312) of operator devices includes: comparing (3128) the estimated multi-device interference to a multi-device interference threshold (e.g., a predetermined interference level threshold over which interference is unacceptable from a multi-operator device sharing perspective); and identifying (3129), in response to said comparing determining that the estimated multi-device interference is above the multi-device interference level threshold, the operator devices in vicinity of said one operator device along with the one operator device as operator devices which are likely to interfere if they share a first set of resources (e.g., a first set of frequencies and/or time-frequency resource such as slots) (e.g., said one operator device and said operator device in the vicinity which are likely to interfere are identified as operator devices of the first group).

Method Embodiment 9. The method of Method Embodiment 1, wherein each of the operator devices in said first group of operator devices are time synchronized at least at a frame timing level.

Method Embodiment 10. The method of Method Embodiment 1, wherein each of the operator devices in said first group of operator devices are time synchronized at least at slot transmission timing level; and wherein said first schedule allocates slots and corresponding transmission resources to operator devices in said first group.

Method Embodiment 11. The method of Method Embodiment 9, wherein said first and second operator devices correspond to different operator networks ((operator device 104 corresponds to operator network 1; operator device 106 corresponds to operator network 2) or (operator device 108 corresponds to operator network 1 and operator device 110 corresponds to operator network 3)).

Method Embodiment 12. The method of Method Embodiment 11, wherein the different network operators are different mobile network operators (MNOs) or mobile virtual network operators (MVNOs).

Method Embodiment 13. The method of Method Embodiment 11, wherein the first and second operator devices are access devices (e.g., cellular base stations or access points) of different types (e.g., cellular or WiFi).

Method Embodiment 14. The method of Method Embodiment 11, wherein the first and second operator devices are different types of base stations (macro cell base station or small cell base station).

Method Embodiment 15. The method of Method Embodiment 1, wherein said first schedule (502 or 550 or 602 or 650) allocates different downlink slots to the first and second operator devices such that the operator devices do not share the same downlink slots.

Method Embodiment 16. The method of Method Embodiment 15, wherein said first schedule (602 or 650) allocates at least some slots to both the first and second operator devices to be used for uplink transmissions at the same time.

Method Embodiment 17. The method of Method Embodiment 15, wherein said step of generating (322) the first schedule allocating resources to operator devices in said first group is based on latency requirements of at least one of the first and second operator devices, said first schedule (502 or 550) including different slots allocated to the first and second operator devices, the time between slots allocated to the first operator device is less than a maximum latency allowed for the first operator device.

Method Embodiment 18. The method of Method Embodiment 15, further comprising: determining (432) a device switching guard interval duration based on a distance between the first and second operator devices; and including (442 or 446) a device switching guard interval of the determined duration in a slot corresponding to a switch between a slot allocated to the first operator device and a slot in the schedule allocated to the second operator device.

Method Embodiment 19. The method of Method Embodiment 18, wherein the determined device switching guard interval is longer the greater the distance is between the first and second operator devices, said determined device switching guard interval having a first duration when the distance between the first and second operator devices is a first distance and a second duration when the distance between the first and second operator devices, the second distance being greater than said first distance, said second duration being longer than said first duration.

Method Embodiment 20. The method of Method Embodiment 15, wherein said step of generating (322) the first schedule allocating resources to operator devices in said first group is based on data transmission requirements of at least one of the first and second operator devices, said first schedule (550 or 650) including a series of consecutive slots allocated to the first one of the operator devices when the first one of the operator devices has a data transmission per unit time period exceeding a first threshold.

Method Embodiment 21. The method of Method Embodiment 20, further comprising: generating (322 2nd iteration) an updated schedule including more switching between slot to device allocations thereby shorting the time between transmission opportunities in response to a latency requirement change requiring a shorter latency than was required when the first schedule was generated; and communicating (332 2nd iteration) the updated schedule to the operator devices in the first group.

Method Embodiment 22. The method of Method Embodiment 1, wherein grouping (312) operator devices seeking to use spectrum into one or more groups based on coverage contour overlap of operator devices, expected interference, or a combination of contour overlap of operator devices and expected interference, includes grouping (316) a second set of operator devices into a second group for resource assignment purposes, said second group including a third operator device and a fourth operator device; the method further comprising: generating (324) a second schedule allocating communications resources to operator devices in said second group, said second schedule allocating communication resources to said third and fourth operator devices; and communicating (e.g., sending) (334) the second schedule to the third and fourth operator devices.

Method Embodiment 23. The method of Method Embodiment 22, wherein the second schedule allocates uplink slots and downlink slots to said third and fourth operator devices.

Method Embodiment 24. The method of Method Embodiment 22, wherein the second schedule allocates uplink time-frequency resource blocks and downlink time-frequency resource blocks to said third and fourth operator devices.

Method Embodiment 25. The method of Method Embodiment 22, wherein the second schedule is different from the first schedule.

Method Embodiment 26. The method of Method Embodiment 25, wherein the second schedule includes a different ratio of downlink slots to uplink slots than the ratio of downlink slots to uplink slots in the first schedule.

Method Embodiment 27. The method of Method Embodiment 25, wherein the second schedule includes a different duration operator switching guard period than the duration of the operator switching guard period in the first schedule.

Method Embodiment 28. The method of Method Embodiment 25, wherein each of the operator devices in said first group of operator devices are time synchronized at least at a frame timing level; and wherein each of the operator devices in said second group of operator devices are time synchronized at least at a frame timing level.

Method Embodiment 29. The method of Method Embodiment 28, wherein the frame timing for the first group is not synchronized to the frame timing of the second group.

Method Embodiment 30. The method of Method Embodiment 29, wherein a frame timing start time for the first group is offset from a frame timing start time for the second group.

Method Embodiment 31. The method of Method Embodiment 29, wherein the duration of a frame for the first group is different from the duration of a frame for the second group.

Numbered List of Exemplary Apparatus Embodiments

Apparatus Embodiment 1. A spectrum scheduling controller (SSC) (102 or 700) comprising: a receiver (716); a transmitter (718); and a processor (702) configured to: operate the SSC to receive (306) (via receiver 716) from each of a plurality of operator devices (104, 106, 108, 110, 112) seeking to use spectrum (e.g., resources of a frequency band that is used by multiple operator devices, e.g., of different types and/or corresponding to different operators) a request for uplink resources (e.g., time and/or frequency resources), a request for downlink resources or a request for both uplink and downlink resources, said plurality of operator devices including a first operator device (104 or 108) and a second operator device (106 or 110); group (312) operator devices seeking to use spectrum into one or more groups (e.g., a group including operator devices 104, 106; another group including operator devices 108, 110) based on coverage contour overlap of operator devices, expected interference, or a combination of contour overlap of operator devices and expected interference, said grouping operator devices including grouping at least a first set of operator devices into a first group for resource assignment purposes, said groups including said first group including the first operator device (104 or 108) and the second operator device (106 or 110); generate (322) a first schedule (502 or 550 or 602 or 650) allocating communications resources to operator devices in said first group, said first schedule allocating communications resources to said first and second operator devices; and operate the SSC to communicate (e.g., send via transmitter 718) (332) the first schedule to the first and second operator devices.

Apparatus Embodiment 2. The spectrum scheduling controller (SSC) (102 or 700) of Apparatus Embodiment 1, wherein said first schedule allocates uplink slots and downlink slots to said first and second operator devices.

Apparatus Embodiment 3. The spectrum scheduling controller (SSC) (102 or 700) of Apparatus Embodiment 1, wherein said first schedule allocates uplink time-frequency resource blocks and downlink time-frequency resource blocks to said first and second operator devices.

Apparatus Embodiment 4. The spectrum scheduling controller (SSC) (102 or 700) of Apparatus Embodiment 1, wherein said processor (702) is further configured to: determine (308) coverage contours for the operator devices seeking to use spectrum; determine (3102) overlapping coverage contour areas; and wherein grouping (312) operator devices seeking to use spectrum into one or more groups is based on overlap of determined coverage contours for the operator devices; and wherein operator devices in the first group have overlapping coverage contours.

Apparatus Embodiment 5. The spectrum scheduling controller (SSC) (102 or 700) of Apparatus Embodiment 1, wherein said processor (702) is further configured to: estimate (3104) interference in determined overlapping coverage contour areas; and wherein said processor (702) is configured to: identify (3121) a first set of operator devices which are likely to interfere with each other based on the estimates of interference in the overlapping coverage contour areas, as part of being configured to group (312) operator devices seeking to use spectrum into one or more groups.

Apparatus Embodiment 6. (overlap of coverage contours grouping case with an overlap threshold being used) The spectrum scheduling controller (SSC) (102 or 700) of Apparatus Embodiment 4, wherein said processor (702) is configured to: compare (3123) coverage contour area overlaps of one or more pairs of spectrum user devices to a first coverage contour overlap threshold (e.g., a threshold corresponding to a 10 percent overlap of contours of spectrum user devices in a pair of spectrum user devices or a fixed size threshold, e.g., an overlap area of a predetermined size); and identify (3124) a first set of operator devices which are likely to interfere with each other if using shared resources, said first set of operator devices being a group of operator devices which have coverage contour area overlaps with other devices in the first set of operator devices which exceed said first coverage contour overlap threshold, as part of being configured to group (312) operator devices.

Apparatus Embodiment 7. (point protection) The spectrum scheduling controller (SSC) (102 or 700) of Apparatus Embodiment 1, wherein said processor (702) is further configured to: estimate (3108) interference from one operator device to another operator device in a first pair of spectrum user devices; and wherein said processor (702) is configured to: compare (3126) the estimated interference to a point interference threshold (e.g., a predetermined interference level threshold over which interference is unacceptable from a spectrum sharing perspective); and identify (3127), in response to said comparing determining that the estimated interference is above the point interference threshold, the operator devices in the first pair of operator devices as operator devices of the first group (e.g., where operator devices in the first group are likely to interfere if they use the same set of frequency resources at any given time), as part of being configured to group (312) operator devices.

Apparatus Embodiment 8. (aggregate protection) The spectrum scheduling controller (SSC) (102 or 700) of Apparatus Embodiment 1, wherein said processor (702) is further configured to: estimate (3112) multi-device interference from all spectrum user devices in the vicinity (e.g., coverage area, coverage area contour, or predetermined distance) of one operator device (e.g., an operator device); and wherein said processor (702) is configured to: compare (3128) the estimated multi-device interference to a multi-device interference threshold (e.g., a predetermined interference level threshold over which interference is unacceptable from a multi-operator device sharing perspective); and identify (3129), in response to said comparing determining that the estimated multi-device interference is above the multi-device interference level threshold, the operator devices in vicinity of said one operator device along with the one operator device as operator devices which are likely to interfere if they share a first set of resources (e.g., a first set of frequencies and/or time-frequency resource such as slots) (e.g., said one operator device and said operator device in the vicinity which are likely to interfere are identified as operator devices of the first group), as part of being configured to group (312) of operator devices.

Apparatus Embodiment 9. The spectrum scheduling controller (SSC) (102 or 700) of Apparatus Embodiment 1, wherein each of the operator devices in said first group of operator devices are time synchronized at least at a frame timing level.

Apparatus Embodiment 10. The spectrum scheduling controller (SSC) (102 or 700) of Apparatus Embodiment 1, wherein each of the operator devices in said first group of operator devices are time synchronized at least at slot transmission timing level; and wherein said first schedule allocates slots and corresponding transmission resources to operator devices in said first group.

Apparatus Embodiment 11. The spectrum scheduling controller (SSC) (102 or 700) of Apparatus Embodiment 9, wherein said first and second operator devices correspond to different operator networks ((operator device 104 corresponds to operator network 1; operator device 106 corresponds to operator network 2) or (operator device 108 corresponds to operator network 1 and operator device 110 corresponds to operator network 3)).

Apparatus Embodiment 12. The spectrum scheduling controller (SSC) (102 or 700) of Apparatus Embodiment 11, wherein the different network operators are different mobile network operators (MNOs) or mobile virtual network operators (MVNOs).

Apparatus Embodiment 13. The spectrum scheduling controller (SSC) (102 or 700) of Apparatus Embodiment 11, wherein the first and second operator devices are access devices (e.g., cellular base stations or access points) of different types (e.g., cellular or WiFi).

Apparatus Embodiment 14. The spectrum scheduling controller (SSC) (102 or 700) of Apparatus Embodiment 11, wherein the first and second operator devices are different types of base stations (macro cell base station or small cell base station).

Apparatus Embodiment 15. The spectrum scheduling controller (SSC) (102 or 700) of Apparatus Embodiment 11, wherein said first schedule (502 or 550 or 602 or 650) allocates different downlink slots to the first and second operator devices such that the operator devices do not share the same downlink slots.

Apparatus Embodiment 16. The spectrum scheduling controller (SSC) (102 or 700) of Apparatus Embodiment 15, wherein said first schedule (602 or 650) allocates at least some slots to both the first and second operator devices to be used for uplink transmissions at the same time.

Apparatus Embodiment 17. The spectrum scheduling controller (SSC) (102 or 700) of Apparatus Embodiment 15, wherein said processor (702) is configured to generate (322) the first schedule allocating resources to operator devices in said first group is based on latency requirements of at least one of the first and second operator devices, said first schedule (502 or 550) including different slots allocated to the first and second operator devices, the time between slots allocated to the first operator device is less than a maximum latency allowed for the first operator device.

Apparatus Embodiment 18. The spectrum scheduling controller (SSC) (102 or 700) of Apparatus Embodiment 15, wherein said processor (702) is further configured to: determine (432) a device switching guard interval duration based on a distance between the first and second operator devices; and include (442 or 446) a device switching guard interval of the determined duration in a slot corresponding to a switch between a slot allocated to the first operator device and a slot in the schedule allocated to the second operator device.

Apparatus Embodiment 19. The spectrum scheduling controller (SSC) (102 or 700) of Apparatus Embodiment 18, wherein the determined device switching guard interval is longer the greater the distance is between the first and second operator devices, said determined device switching guard interval having a first duration when the distance between the first and second operator devices is a first distance and a second duration when the distance between the first and second operator devices, the second distance being greater than said first distance, said second duration being longer than said first duration.

Apparatus Embodiment 20. The spectrum scheduling controller (SSC) (102 or 700) of Apparatus Embodiment 15, wherein said processor (702) is configured to generate (322) the first schedule allocating resources to operator devices in said first group is based on data transmission requirements of at least one of the first and second operator devices, said first schedule (550 or 650) including a series of consecutive slots allocated to the first one of the operator devices when the first one of the operator devices has a data transmission per unit time period exceeding a first threshold.

Apparatus Embodiment 21. The spectrum scheduling controller (SSC) (102 or 700) of Apparatus Embodiment 20, wherein said processor (702) is further configured to: generate (322 2nd iteration) an updated schedule including more switching between slot to device allocations thereby shorting the time between transmission opportunities in response to a latency requirement change requiring a shorter latency than was required when the first schedule was generated; and operate the SSC to communicate (332 2nd iteration) (via transmitter 718) the updated schedule to the operator devices in the first group.

Apparatus Embodiment 22. The spectrum scheduling controller (SSC) (102 or 700) of Apparatus Embodiment 1, wherein said processor (702) is further configured to: group (316) a second set of operator devices into a second group for resource assignment purposes, as part of being configured to group (312) operator devices seeking to use spectrum into one or more groups based on coverage contour overlap of operator devices, expected interference, or a combination of contour overlap of operator devices and expected interference, said second group including a third operator device and a fourth operator device; generate (324) a second schedule allocating resources to operator devices in said second group, said second schedule allocating uplink and downlink slots to said third and fourth operator devices; and operate the SSC to communicate (e.g., sending) (334) (e.g., via transmitter 718) the second schedule to the third and fourth operator devices.

Apparatus Embodiment 23. The spectrum scheduling controller (SSC) (102 or 700) of Apparatus Embodiment 22, wherein the second schedule allocates uplink slots and downlink slots to said third and fourth operator devices.

Apparatus Embodiment 24. The spectrum scheduling controller (SSC) (102 or 700) of Apparatus Embodiment 22, wherein the second schedule allocates uplink time-frequency resource blocks and downlink time-frequency resource blocks to said third and fourth operator devices.

Apparatus Embodiment 25. The spectrum scheduling controller (SSC) (102 or 700) of Apparatus Embodiment 22, wherein the second schedule is different from the first schedule.

Apparatus Embodiment 26. The spectrum scheduling controller (SSC) (102 or 700) of Apparatus Embodiment 25, wherein the second schedule includes a different ratio of downlink slots to uplink slots than the ratio of downlink slots to uplink slots in the first schedule.

Apparatus Embodiment 27. The spectrum scheduling controller (SSC) (102 or 700) of Apparatus Embodiment 25, wherein the second schedule includes a different duration operator switching guard period than the duration of the operator switching guard period in the first schedule.

Apparatus Embodiment 28. The spectrum scheduling controller (SSC) (102 or 700) of Apparatus Embodiment 25, wherein each of the operator devices in said first group of operator devices are time synchronized at least at a frame timing level; and wherein each of the operator devices in said second group of operator devices are time synchronized at least at a frame timing level.

Apparatus Embodiment 29. The spectrum scheduling controller (SSC) (102 or 700) of Apparatus Embodiment 28, wherein the frame timing for the first group is not synchronized to the frame timing of the second group.

Apparatus Embodiment 30. The spectrum scheduling controller (SSC) (102 or 700) of Apparatus Embodiment 29, wherein a frame timing start time for the first group is offset from a frame timing start time for the second group.

Apparatus Embodiment 31. The spectrum scheduling controller (SSC) (102 or 700) of Apparatus Embodiment 29, wherein the duration of a frame for the first group is different from the duration of a frame for the second group.

Numbered List of Exemplary Non-Transitory
Machine Readable Medium Embodiments

Non-Transitory Machine Readable Medium Embodiment 1. A non-transitory machine readable medium (712) including processor executable instructions, which when executed by a processor (702) of a spectrum schedule controller (SSC) (102 or 700) control the SSC (102 or 700) to perform the steps of: receiving (306) from each of a plurality of operator devices (104, 106, 108, 110, 112) seeking to use spectrum (e.g., resources of a frequency band that is used by multiple operator devices, e.g., of different types and/or corresponding to different operators) a request for uplink resources (e.g., time and/or frequency resources), a request for downlink resources or a request for both uplink and downlink resources, said plurality of operator devices including a first operator device (104 or 108) and a second operator device (106 or 110); grouping (312) operator devices seeking to use spectrum into one or more groups (e.g. a group including operator devices 104, 106; another group including operator devices 108, 110) based on coverage contour overlap of operator devices, expected interference, or a combination of contour overlap of operator devices and expected interference, said grouping operator devices including grouping at least a first set of operator devices into a first group for resource assignment purposes, said groups including said first group including the first operator device (104 or 108) and the second operator device (106 or 110); generating (322) a first schedule (502 or 550 or 602 or 650) allocating communications resources to operator devices in said first group, said first schedule allocating communications resources to said first and second operator devices; and communicating (e.g., sending) (332) the first schedule to the first and second operator devices.

Various embodiments are directed to apparatus, e.g., spectrum scheduling controllers (SSCs), operator devices (spectrum user operator devices which request resources and receive allocations from a SSC) such as, e.g. macro cell base station, small cell base station, and/or other types of access nodes, end user devices, e.g., UEs, protected devices, e.g. PAL base stations, interfering devices, e.g. a non-PAL CBSDs (GAA CBSDs), other control devices, UEs, access points, a device including a AMF, a device including a UDM, a device including a SMF, a device including a PCF, a device including a UPF, a server, a device including a N3IWF, a device including a TNGF, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices.

Various embodiments are also directed to methods, e.g., method of controlling and/or operating a spectrum scheduling controller (SSC), an operator device, an end user device, a protected device, e.g. a PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and an MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a spectrum scheduling controller (SSC), an operator device, an end user device, a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a spectrum scheduling controller (SSC), an operator device, an end user device, a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc. supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a spectrum scheduling controller (SSC), an operator device, an end user device, a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a spectrum scheduling controller (SSC), an operator device, an end user device, a protected device, e.g. PAL base station, an interfering device, e.g. a non-PAL CBSD (GAA CBSD), other control device, UE, an access point, a device including a AMF, a device including a UDM, a device including a SMF, a device including a PCF, a device including a UPF, a server, a device including a N3IWF, a device including a TNGF, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a spectrum scheduling controller (SSC), an operator device, an end user device, a protected device, e.g. PAL base station, an interfering device, e.g. a non-PAL CBSD (GAA CBSD), other control devices, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a spectrum scheduling controller (SSC), the method comprising:

receiving from each of a plurality of operator devices seeking to use spectrum a request for uplink resources, a request for downlink resources or a request for both uplink and downlink resources, said plurality of operator devices including a first operator device and a second operator device;

grouping operator devices seeking to use spectrum into one or more groups based on coverage contour overlap of operator devices, expected interference, or a combination of contour overlap of operator devices and expected interference, said grouping operator devices including grouping at least a first set of operator devices into a first group for resource assignment purposes, said one or more groups including said first group, said first group including the first operator device and the second operator device;

determining a device switching guard interval duration based on a distance between the first and second operator devices;

generating a first schedule allocating communications resources to operator devices in said first group, said first schedule allocating communication resources to said first and second operator devices, said first schedule allocating uplink slots and downlink slots to said first and second operator devices, said first schedule including a device switching guard interval, of the determined device switching guard interval duration, in a slot, corresponding to a switch between a first slot in the first schedule allocated to the first operator device and another slot in the first schedule allocated to the second operator device; and communicating the first schedule to the first and second operator devices.

2. The method of claim 1, wherein said first schedule allocates uplink time-frequency resource blocks and downlink time-frequency resource blocks to said first and second operator devices.

3. The method of claim 1, further comprising:

determining coverage contours for the operator devices seeking to use spectrum;

determining overlapping coverage contour areas; and wherein grouping operator devices seeking to use spectrum into one or more groups is based on overlap of determined coverage contours for the operator devices; and wherein operator devices in the first group have overlapping coverage contours.

4. The method of claim 3, wherein grouping operator devices seeking to use spectrum into one or more groups includes:

comparing coverage contour area overlaps of one or more pairs of spectrum user devices to a first coverage contour overlap threshold; and identifying the first set of operator devices, said first set of operator devices being operator devices which are likely to interfere with each other if using shared resources, said first set of operator devices being a group of operator devices which have coverage contour area overlaps with other devices in the first set of operator devices which exceed said first coverage contour overlap threshold.

5. The method of claim 1, further comprising:

estimating interference in determined overlapping coverage contour areas; and wherein grouping operator devices seeking to use spectrum into one or more groups includes:

identifying the first set of operator devices, said first set of operator devices being operator devices which are likely to interfere with each other based on the estimates of interference in the overlapping coverage contour areas.

6. The method of claim 1, further comprising:

estimating interference from one operator device to another operator device in a first pair of spectrum user devices; and wherein grouping operator devices seeking to use spectrum into one or more groups includes:

comparing the estimated interference to a point interference threshold; and identifying, in response to said comparing determining that the estimated interference is above the point interference threshold, the operator devices in the first pair of operator devices as operator devices of the first group.

7. The method of claim 1, further comprising:

estimating multi-device interference from all spectrum user devices in the vicinity of one operator device; and wherein grouping operator devices seeking to use spectrum into one or more groups includes:

comparing the estimated multi-device interference to a multi-device interference threshold; and identifying, in response to said comparing determining that the estimated multi-device interference is above the multi-device interference level threshold, the operator devices in vicinity of said one operator device along with the one operator device as operator devices which are likely to interfere if they share a first set of resources.

8. The method of claim 1, wherein each of the operator devices in said first group of operator devices are time synchronized at least at slot transmission timing level; and wherein said first schedule allocates slots and corresponding transmission resources to operator devices in said first group.

9. The method of claim 1, wherein said first schedule allocates different downlink slots to the first and second operator devices such that the operator devices do not share the same downlink slots.

10. The method of claim 9, wherein said first schedule allocates at least some slots to both the first and second operator devices to be used for uplink transmissions at the same time.

11. The method of claim 1, wherein the determined device switching guard interval duration is longer the greater the distance is between the first and second operator devices, said determined device switching guard interval duration having a first duration when the distance between the first and second operator devices is a first distance and a second duration when the distance between the first and second operator devices, the second distance being greater than said first distance, said second duration being longer than said first duration.

12. A method of operating a spectrum scheduling controller (SSC), the method comprising:

receiving from each of a plurality of operator devices seeking to use spectrum a request for uplink resources, a request for downlink resources or a request for both uplink and downlink resources, said plurality of operator devices including a first operator device and a second operator device;

grouping operator devices seeking to use spectrum into one or more groups based on coverage contour overlap of operator devices, expected interference, or a combination of contour overlap of operator devices and expected interference, said grouping operator devices including grouping at least a first set of operator devices into a first group for resource assignment purposes, said one or more groups including said first group, said first group including the first operator device and the second operator device;

generating a first schedule allocating communications resources to operator devices in said first group, said first schedule allocating communication resources to said first and second operator devices, said step of generating the first schedule allocating resources to operator devices in said first group being based on data transmission requirements of at least one of the first and second operator devices, said first schedule including a series of consecutive slots allocated to the first operator device when the first operator device has a data transmission per unit time period exceeding a first threshold; and communicating the first schedule to the first and second operator devices.

13. The method of claim 12, further comprising:

generating an updated schedule including more switching between slot to device allocations thereby shorting the time between transmission opportunities in response to a latency requirement change requiring a shorter latency than was required when the first schedule was generated; and communicating the updated schedule to the operator devices in the first group.

14. A spectrum scheduling controller (SSC) comprising:
a receiver;
a transmitter; and
a processor configured to:

operate the SSC to receive from each of a plurality of operator devices seeking to use spectrum a request for uplink resources, a request for downlink resources or a request for both uplink and downlink resources, said plurality of operator devices including a first operator device and a second operator device;

group operator devices seeking to use spectrum into one or more groups based on coverage contour overlap of operator devices, expected interference, or a combination of contour overlap of operator devices and expected interference, said grouping operator devices including grouping at least a first set of operator devices into a first group for resource assignment purposes, said one or more groups including said first group, said first group including the first operator device and the second operator device;

determine a device switching guard interval duration based on a distance between the first and second operator devices;

generate a first schedule allocating communications resources to operator devices in said first group, said first schedule allocating communications resources to said first and second operator devices, said first schedule allocating uplink slots and downlink slots to said first and second operator devices, said first schedule including a device switching guard interval, of the determined device switching guard interval duration, in a slot, corresponding to a switch between a first slot in the first schedule allocated to the first operator device and another slot in the first schedule allocated to the second operator device; and operate the SSC to communicate the first schedule to the first and second operator devices.

15. The spectrum scheduling controller (SSC) of claim 14, wherein said first schedule allocates uplink time-frequency resource blocks and downlink time-frequency resource blocks to said first and second operator devices.

16. The spectrum scheduling controller (SSC) of claim 14, wherein said processor is further configured to:

determine coverage contours for the operator devices seeking to use spectrum;

determine overlapping coverage contour areas; and wherein grouping operator devices seeking to use spectrum into one or more groups is based on overlap of determined coverage contours for the operator devices; and wherein operator devices in the first group have overlapping coverage contours.

17. A non-transitory machine readable medium including processor executable instructions, which when executed by a processor of a spectrum scheduling controller (SSC), control the SSC to perform the steps of:

receiving from each of a plurality of operator devices seeking to use spectrum a request for uplink resources, a request for downlink resources or a request for both uplink and downlink resources, said plurality of operator devices including a first operator device and a second operator device;

grouping operator devices seeking to use spectrum into one or more groups based on coverage contour overlap of operator devices, expected interference, or a combination of contour overlap of operator devices and expected interference, said grouping operator devices including grouping at least a first set of operator devices into a first group for resource assignment purposes, said one or more groups including said first group, said first group including the first operator device and the second operator device, determining a device switching guard interval duration based on a distance between the first and second operator devices;

generating a first schedule allocating communications resources to operator devices in said first group, said first schedule allocating communications resources to said first and second operator devices, said first schedule allocating uplink slots and downlink slots to said first and second operator devices, said first schedule including a device switching guard interval, of the determined device switching guard interval duration, in a slot, corresponding to a switch between a first slot in the first schedule allocated to the first operator device and another slot in the first schedule allocated to the second operator device; and communicating the first schedule to the first and second operator devices.

\* \* \* \* \*